US010381612B2

(12) United States Patent
Maeda et al.

(10) Patent No.: US 10,381,612 B2
(45) Date of Patent: Aug. 13, 2019

(54) ENERGY STORAGE DEVICE

(71) Applicant: GS Yuasa International Ltd., Kyoto-shi (JP)

(72) Inventors: Kazuto Maeda, Kyoto (JP); Hirokazu Kambayashi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 148 days.

(21) Appl. No.: 15/700,674

(22) Filed: Sep. 11, 2017

(65) Prior Publication Data

US 2018/0097208 A1 Apr. 5, 2018

(30) Foreign Application Priority Data

Sep. 30, 2016 (JP) ................. 2016-193648

(51) Int. Cl.
*H01M 2/02* (2006.01)
*H01M 2/04* (2006.01)
*H01M 2/06* (2006.01)
*H01M 2/30* (2006.01)
(Continued)

(52) U.S. Cl.
CPC ......... *H01M 2/043* (2013.01); *H01M 2/0277* (2013.01); *H01M 2/0426* (2013.01); *H01M 2/0473* (2013.01); *H01M 2/06* (2013.01); *H01M 2/263* (2013.01); *H01M 2/30* (2013.01); *H01M 10/0525* (2013.01); *H01M 2220/20* (2013.01)

(58) Field of Classification Search
CPC .. H01M 2/043; H01M 2/0277; H01M 2/0426; H01M 2/0473; H01M 2/06; H01M 2/263; H01M 2/30; H01M 10/052; H01M 10/0525; H01M 2220/20
See application file for complete search history.

(56) References Cited

U.S. PATENT DOCUMENTS

2010/0233528 A1 9/2010 Kim et al.
2012/0321943 A1* 12/2012 Ito .................. H01M 2/06
429/179
(Continued)

FOREIGN PATENT DOCUMENTS

JP 2003-249419 A 9/2003
JP 2009-283335 A 12/2009
(Continued)

*Primary Examiner* — Raymond Alejandro
(74) *Attorney, Agent, or Firm* — McGinn IP Law Group, PLLC.

(57) ABSTRACT

An energy storage device includes a first locking portion for locking a rotation of a positive electrode current collecting member about a shaft portion of a positive electrode terminal with respect to a lower insulating member. The first locking portion includes: a recessed portion formed on the lower insulating member; and a projecting portion formed on the positive electrode current collecting member. The recessed portion is indented away from the shaft portion in a direction which intersects with the shaft portion. The projecting portion projects away from the shaft portion in the direction which intersects with the shaft portion. The recessed portion and the projecting portion are configured to engage with each other. A leg portion is positioned closer to an end portion of a lid body in a longitudinal direction of the lid body than the first locking portion is.

7 Claims, 10 Drawing Sheets

(51) Int. Cl.
*H01M 10/0525* (2010.01)
*H01M 2/26* (2006.01)

(56) References Cited

U.S. PATENT DOCUMENTS

2013/0115490 A1* 5/2013 Kim .................. H01M 10/0431
  429/82
2014/0363731 A1 12/2014 Tanaka et al.
2016/0043380 A1 2/2016 Wakimoto et al.
2016/0293930 A1* 10/2016 Guen .................... H01M 2/345

FOREIGN PATENT DOCUMENTS

| | | | |
|---|---|---|---|
| JP | 2010-212240 A | 9/2010 |
| JP | 2012-049077 A | 3/2012 |
| JP | 2013-093160 A | 5/2013 |
| JP | 2014-032967 A | 2/2014 |
| JP | 2015-230795 A | 12/2015 |
| JP | 2016-039016 A | 3/2016 |

* cited by examiner

ENERGY STORAGE DEVICE

CROSS-REFERENCE TO RELATED APPLICATIONS

This application is based on Japanese Patent Application No. 2016-193648, filed on Sep. 30, 2016, the entire contents of which are hereby incorporated by reference.

FIELD

The present invention relates to an energy storage device which includes an electrode assembly and a current collecting member connected to the electrode assembly.

BACKGROUND

Among energy storage devices such as a lithium ion secondary battery, there has been known an energy storage device where an electrode assembly which includes a positive electrode and a negative electrode is connected to electrode terminals through current collecting members. For example, JP 2010-212240 A discloses a secondary battery which is configured such that insulators which form insulating members and a cap plate which forms a lid body of a container are sandwiched between current collecting members and electrode terminals connected to each other. The first insulator is disposed between the electrode terminal and the cap plate, and the second insulator is disposed between the cap plate and the current collecting member. A shaft of the electrode terminal penetrates the insulator and the cap plate, and is connected to the current collecting member. An extension groove is formed on the second insulator, and an extension portion is formed on the current collecting member. The extension groove and the extension portion are configured to be joined to each other.

In the secondary battery described in JP 2010-212240 A, due to joining between the extension groove and the extension portion, the relative rotation between the second insulator and the current collecting member about the shaft of the electrode terminal can be prevented. The extension groove and the extension portion are disposed at a position closer to an end portion of the cap plate than the shaft of the electrode terminal is. To be more specific, the extension portion is disposed at an end portion of the current collecting member in the vicinity of the end portion of the cap plate, and the extension groove is disposed between the extension portion and the end portion of the cap plate. Accordingly, it is necessary to ensure a space between the end portion of the current collecting member and the end portion of the cap plate. Thus, the electrode assembly for storing energy cannot be disposed in the space. A volume of the electrode assembly in a container of the secondary battery is forced to be small and hence, energy density of the energy storage device is lowered.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage device which can enhance energy density.

According to an aspect of the present invention, there is provided an energy storage device which includes: an electrode assembly; a container which accommodates the electrode assembly and includes a lid body extending in a longitudinal direction; a shaft which penetrates the lid body; a current collecting member which has a leg portion to be connected to the electrode assembly; an insulating member which is disposed between the current collecting member and the lid body; and a first locking portion for locking a rotation of the current collecting member about the shaft with respect to the insulating member, wherein the first locking portion includes: a recessed portion or a projecting portion formed on the insulating member, and a projecting portion or a recessed portion formed on the current collecting member, the recessed portion or the projecting portion formed on the insulating member is indented away from the shaft or projects toward the shaft in a direction which intersects with the shaft, the projecting portion or the recessed portion formed on the current collecting member projects away from the shaft or is indented toward the shaft in the direction which intersects with the shaft, the recessed portion or the projecting portion formed on the insulating member and the projecting portion or the recessed portion formed on the current collecting member are configured to engage with each other, and the leg portion is positioned closer to an end portion of the lid body in the longitudinal direction than the first locking portion is.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
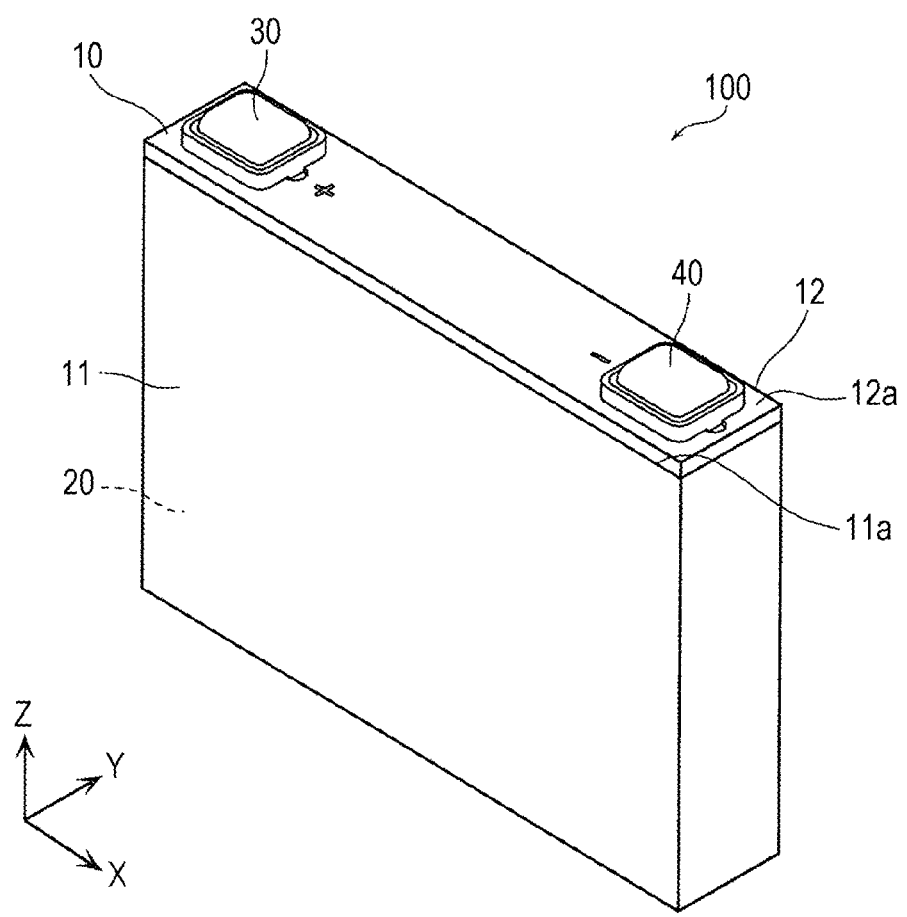
FIG. 1 is a perspective view schematically showing an external appearance of an energy storage device according to an embodiment.

According to an aspect of the present invention, there is provided an energy storage device which includes: an electrode assembly; a container which accommodates the electrode assembly and includes a lid body extending in a longitudinal direction; a shaft which penetrates the lid body; a current collecting member which has a leg portion to be connected to the electrode assembly; an insulating member which is disposed between the current collecting member and the lid body; and a first locking portion for locking a rotation of the current collecting member about the shaft with respect to the insulating member, wherein the first locking portion includes: a recessed portion or a projecting portion formed on the insulating member, and a projecting portion or a recessed portion formed on the current collecting member, the recessed portion or the projecting portion formed on the insulating member is indented away from the shaft or projects toward the shaft in a direction which intersects with the shaft, the projecting portion or the recessed portion formed on the current collecting member projects away from the shaft or is indented toward the shaft in the direction which intersects with the shaft, the recessed portion or the projecting portion formed on the insulating member and the projecting portion or the recessed portion formed on the current collecting member are configured to engage with each other, and the leg portion is positioned closer to an end portion of the lid body in the longitudinal direction than the first locking portion is.

The recessed portion or the projecting portion formed on the insulating member may be the recessed portion formed on the insulating member, the recessed portion formed on the insulating member may be indented away from the shaft in the direction which intersects with the shaft, the projecting portion or the recessed portion formed on the current collecting member may be the projecting portion formed on the current collecting member, the projecting portion formed on the current collecting member may project away from the shaft in the direction which intersects with the shaft, and the recessed portion and the projecting portion may be configured to engage with each other.

The recessed portion or the projecting portion formed on the insulating member may be the projecting portion formed on the insulating member, the projecting portion formed on the insulating member may project toward the shaft in the direction which intersects with the shaft, the projecting portion or the recessed portion formed on the current collecting member may be the recessed portion formed on the current collecting member, the recessed portion formed on the current collecting member may be indented toward the shaft in the direction which intersects with the shaft, and the projecting portion and the recessed portion may be configured to engage with each other.

The first locking portion may be disposed on at least one of both ends of the current collecting member in the longitudinal direction of the lid body.

The energy storage device may further include a second locking portion for locking the rotation of the insulating member about the shaft with respect to the lid body, the second locking portion may include: a projecting portion which projects from the lid body in a direction parallel to the shaft; and a receiving portion which is formed on the insulating member and is configured to engage with the projecting portion, and the projecting portion and the receiving portion may be configured to engage with each other.

A gap may be formed in the first locking portion between a portion of the first locking portion around the projecting portion or the recessed portion formed on the current collecting member and a portion of the first locking portion around the recessed portion or the projecting portion formed on the insulating member.

The insulating member may include a protruding portion which projects in a direction parallel to the shaft, and the current collecting member may include a hole, and the protruding portion may be fitted into the hole.

According to the energy storage device of the present invention, it is possible to enhance energy density.

Hereinafter, an energy storage device according to an embodiment of the present invention is described with reference to drawings. All embodiments described hereinafter describe preferred specific examples of the present invention. In the embodiments described hereinafter, numerical values, shapes, materials, constitutional elements, the arrangement positions and connection states of the constitutional elements and the like are merely examples, and these are not intended to be used for limiting the present invention. Further, out of the constitutional elements in the embodiments described hereinafter, the constitutional elements which are not described in independent claims describing an uppermost concept of the present invention are described as arbitrary constitutional elements.

The respective views in the attached drawings are schematic views and are not necessarily strictly described in an actual scale. In the respective drawings, the identical or the substantially identical constitutional elements are given the same symbols. Further, in the description of the embodiments made hereinafter, there may be a case where the expression which is affixed with "substantially" such as "substantially parallel" or "substantially orthogonal" is used. For example, "substantially parallel" means not only "completely parallel" but also "substantially parallel". That is, "substantially" includes the difference of several %, for example. The same goes for other expressions which are affixed with "substantially".

Embodiment

A configuration of an energy storage device 100 according to an embodiment is described. FIG. 1 is a perspective view schematically showing an external appearance of the energy storage device 100 according to the embodiment. As shown in FIG. 1, the energy storage device 100 has a flat rectangular parallelepiped outer shape. The energy storage device 100 is a chargeable and dischargeable secondary battery. For example, the energy storage device 100 is a nonaqueous electrolyte secondary battery such as a lithium ion secondary battery. However, the energy storage device 100 is not limited to the nonaqueous electrolyte secondary battery, and may be a secondary battery other than the nonaqueous electrolyte secondary battery, may be a primary battery which a user can use stored electricity without being charged by the user, or may be a capacitor.

Figure 2:
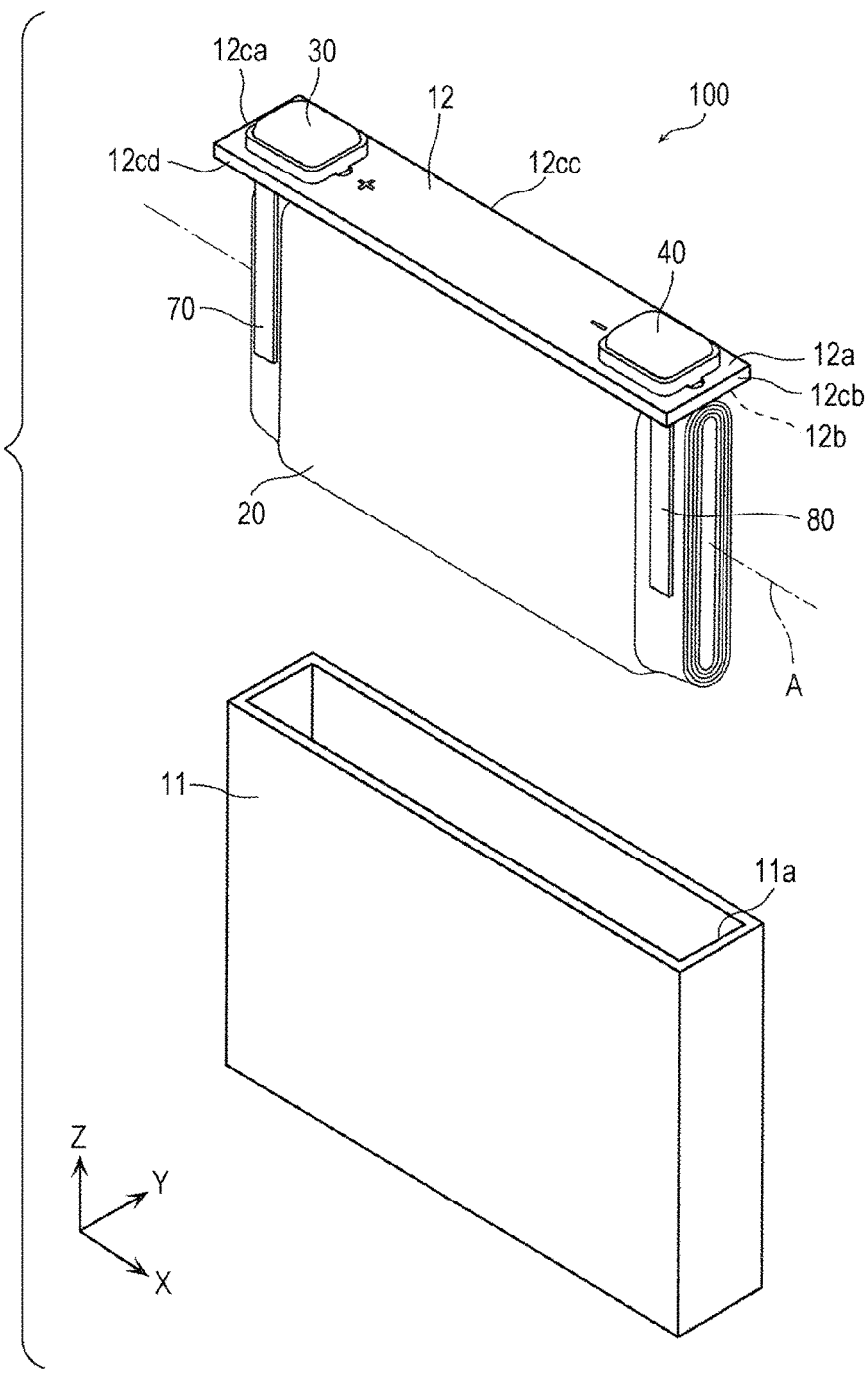
FIG. 2 is an exploded perspective view partially showing the energy storage device in FIG. 1.

FIG. 2 is an exploded perspective view partially showing the energy storage device 100 in FIG. 1. With reference to FIG. 1 and FIG. 2, the energy storage device 100 includes a container 10 having a flat rectangular parallelepiped shape, an electrode assembly 20 which is accommodated in the container 10, and a positive electrode terminal 30 and a negative electrode terminal 40 which respectively form an electrode terminal.

The container 10 includes: a container body 11 having a bottomed prismatic cylindrical shape; and an elongated rectangular plate-like lid body 12 which can close an elongated rectangular-shaped opening portion 11a of the container body 11. The container body 11 and the lid body 12 are fixed to each other using a joining method such as welding in a state where sealing joint portions of the container body 11 and the lid body 12 are joined to each other hermetically. Although a material for forming the container body 11 and the lid body 12 is not limited, the container body 11 and the lid body 12 may be made of weldable metal such as stainless steel, aluminum, or an aluminum alloy, for example.

The lid body 12 has an outer surface 12a and an inner surface 12b each having a rectangular shape. The outer surface 12a and the inner surface 12b are respectively formed of a wide flat surface, and are disposed opposite to each other. The lid body 12 has end portions 12ca, 12cb, 12cc, 12cd at the periphery of the outer surface 12a and the inner surface 12b. The end portions 12ca, 12cb form both end portions of the lid body 12 in a longitudinal direction of the outer surface 12a and the inner surface 12b, and are disposed opposite to each other. The end portions 12cc, 12cd form both end portions of the lid body 12 in a lateral direction of the outer surface 12a and the inner surface 12b, and are disposed opposite to each other.

In this specification, a direction extending along the end portions 12cc, 12cd of the lid body 12 and extending along the outer surface 12a and the inner surface 12b is defined as an X axis direction and, further, a direction extending from the end portion 12ca toward the end portion 12cb is defined as an X axis positive direction, and a direction opposite to the X axis positive direction is defined as an X axis negative direction. The X axis direction is also a longitudinal direction of the lid body 12. A direction extending along the end portions 12ca, 12cb of the lid body 12 and extending along the outer surface 12a and the inner surface 12b is defined as a Y axis direction and, further, a direction extending from the end portion 12cd toward the end portion 12cc is defined as a Y axis positive direction, and a direction opposite to the Y axis positive direction is defined as a Y axis negative direction. The Y axis direction is also a lateral direction of the lid body 12. A direction extending perpendicular to the outer surface 12a and the inner surface 12b is defined as a Z axis direction and, further, a direction extending from the inner surface 12b toward the outer surface 12a is defined as a Z axis positive direction, and a direction opposite to the Z axis positive direction is defined as a Z axis negative direction. The X axis direction, the Y axis direction, and the Z axis direction are orthogonal to each other.

Although an electrolyte such as an electrolyte solution (in this embodiment, a nonaqueous electrolyte solution) is sealed in the container 10 together with the electrode assembly 20, the illustration of the electrolyte is omitted. With respect to the electrolyte sealed in the container 10, a kind of the electrolyte is not particularly limited and various kinds of electrolyte can be selected provided that performance of the energy storage device 100 is not impaired.

The positive electrode terminal 30 and the negative electrode terminal 40 having conductivity are disposed on the outer surface 12a of the lid body 12. The positive electrode terminal 30 is disposed in the vicinity of the end portion 12ca, and the negative electrode terminal 40 is disposed in the vicinity of the end portion 12cb. The positive electrode terminal 30 and the negative electrode terminal 40 penetrate the lid body 12 respectively, and are physically and electrically connected to a positive electrode current collecting member 70 and a negative electrode current collecting member 80 having conductivity on a side opposite to the outer surface 12a of the lid body 12 respectively. The positive electrode current collecting member 70 and the negative electrode current collecting member 80 are also physically and electrically connected to the electrode assembly 20 respectively. The positive electrode current collecting member 70 and the negative electrode current collecting member 80 are accommodated in the container body 11 together with the electrode assembly 20.

The electrode assembly 20 is an energy storage element (also referred to as a power generating element) which can store electricity. The electrode assembly 20 is formed by winding a sheet-like positive electrode plate (not shown in the drawing), a sheet-like negative electrode plate (not shown in the drawing), and a sheet-like separator (not shown in the drawing) together in a spiral shape about a winding axis A. With such a configuration, the positive electrode plate and the negative electrode plate are stacked to each other in a multilayered manner about the winding axis A with the separator interposed therebetween. The winding axis A is an imaginary axis indicated by a dotted chain line in FIG. 2, and the electrode assembly 20 is configured substantially symmetrically with respect to the winding axis A. Although the configuration of the electrode assembly 20 is not limited, in this embodiment, the electrode assembly 20 has a flat outer shape such that the electrode assembly 20 has an elongated circular shape in cross section perpendicular to the winding axis A. Such an electrode assembly 20 includes two bent portions and a flat portion disposed between two bent portions about the winding axis A. However, a cross-sectional shape of the electrode assembly 20 may be formed in a shape other than the elongated circular shape, that is, a circular shape, an elliptical shape, a rectangular shape or other polygonal shapes.

The positive electrode plate includes: a positive electrode base material (not shown in the drawing) which is a strip-shaped metal foil made of metal such as aluminum or an aluminum alloy; and a positive active material layer (not shown in the drawing) formed on the positive electrode base material. The negative electrode plate includes: a negative electrode base material (not shown in the drawing) which is a strip-shaped metal foil made of metal such as copper or a copper alloy; and a negative active material layer (not shown in the drawing) which is formed on the negative electrode base material. As a positive active material used for forming the positive active material layer and a negative active material used for forming the negative active material layer, known materials can be suitably used provided that the materials are a positive active material and a negative active material which can occlude and discharge lithium ions. The separator is a sheet made of a material having an electrical insulating property such as a resin, and is a microporous sheet, for example.

The electrode assembly 20 is configured such that the positive electrode plate of the electrode assembly 20 on one end portion in a winding axis A direction is connected to the positive electrode current collecting member 70, and the negative electrode plate of the electrode assembly 20 on the other end portion in a winding axis A direction is connected to the negative electrode current collecting member 80. In this specification, the electrode assembly 20 is arranged with respect to the lid body 12 such that the winding axis A is directed along the longitudinal direction of the lid body 12, and one of the bent portions of the electrode assembly 20 faces the lid body 12.

Figure 3:
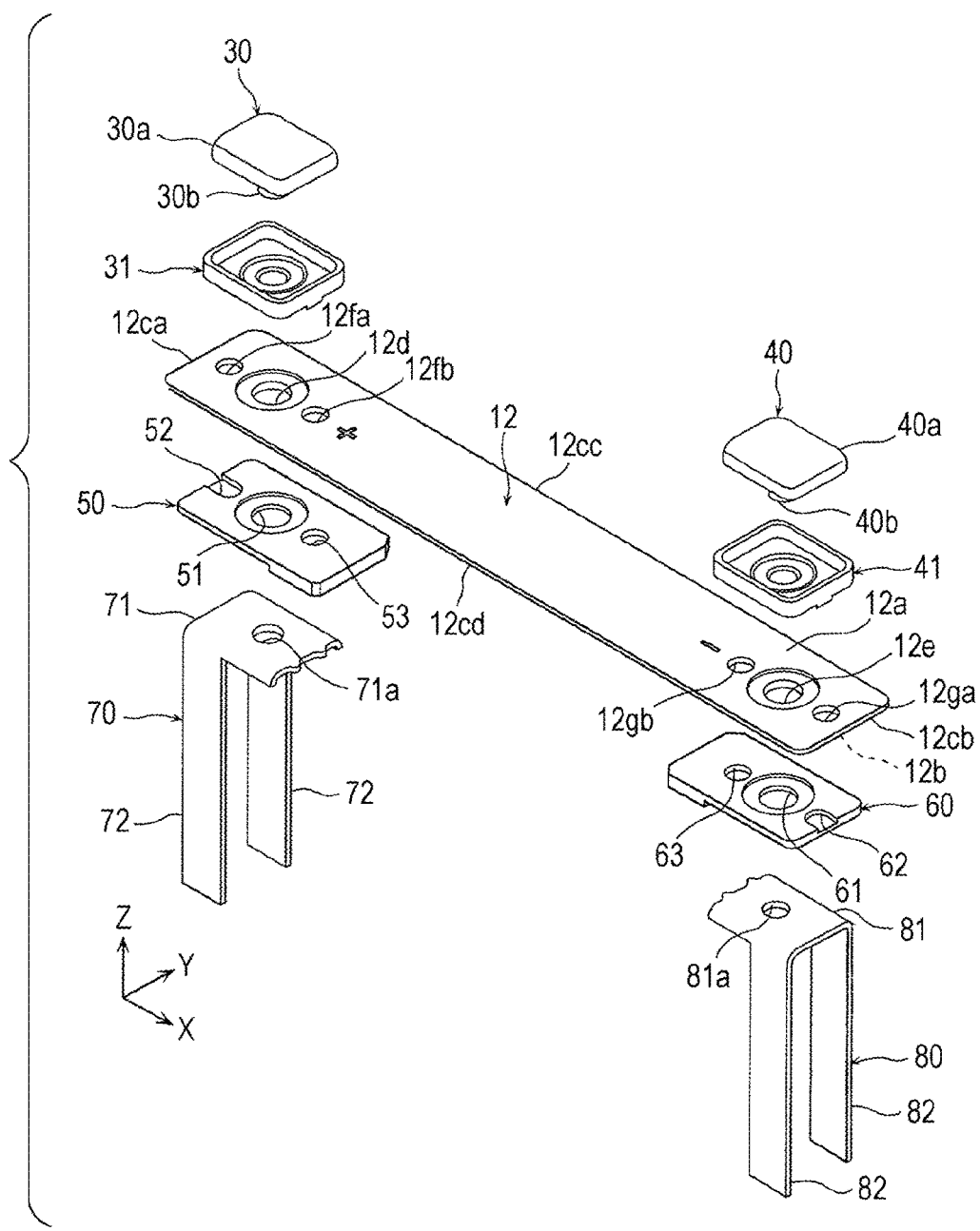
FIG. 3 is an exploded perspective view of a positive electrode terminal and a negative electrode terminal and constitutional elements around the positive electrode terminal and the negative electrode terminal shown in FIG. 2.
Figure 4:
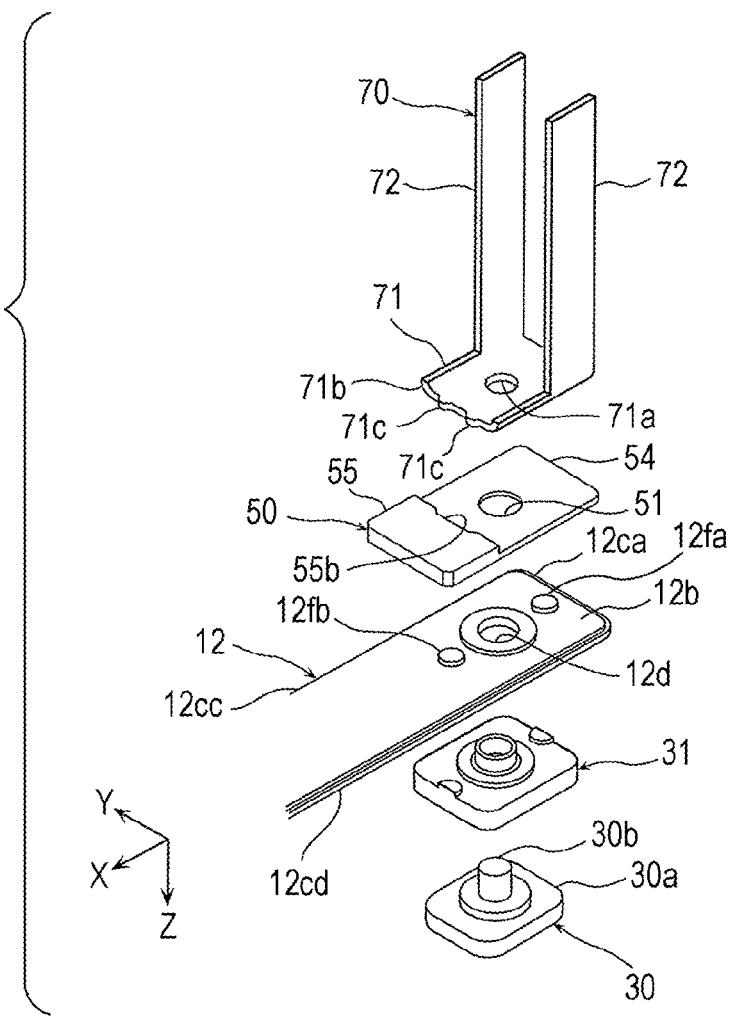
FIG. 4 is an exploded perspective view of the positive electrode terminal and the constitutional elements around the positive electrode terminal shown in FIG. 3 as viewed in a direction different from the viewing direction of FIG. 3.

FIG. 3 and FIG. 4 are exploded perspective views of the positive electrode terminal 30, the negative electrode terminal 40, and constitutional elements around the positive electrode terminal 30 and the negative electrode terminal 40. FIG. 3 is the exploded perspective view showing the positive electrode terminal 30 and the negative electrode terminal 40 and the constitutional elements around the positive electrode terminal 30 and the negative electrode terminal 40 shown in FIG. 2. FIG. 4 is the exploded perspective view showing the positive electrode terminal 30 and the constitutional elements around the positive electrode terminal 30 shown in FIG. 3 as viewed in a direction different from the viewing direction of FIG. 3. The positive electrode terminal 30 and the negative electrode terminal 40 are made of a material having conductivity respectively. The positive electrode terminal 30 and the negative electrode terminal 40 respectively include: a terminal body 30a, 40a; and circular-cylindrical-shaped shaft portion 30b, 40b extending from the terminal body. In this specification, the shaft portions 30b, 40b are respectively an example of the shaft.

Upper insulating members 31, 41 and lower insulating members 50, 60 are provided for ensuring the electric insulation between the positive and negative electrode terminals 30, 40 and the lid body 12 and the electric insulation between the lid body 12 and the positive and negative electrode current collecting members 70, 80. The upper insulating members 31, 41 and the lower insulating members 50, 60 respectively have a rectangular plate-like shape, and are made of a material having electrical insulating property such as a resin. The upper insulating members 31, 41 and the lower insulating members 50, 60 are gaskets made of polyphenylene sulfide (PPS), polyether ether ketone (PEEK), polypropylene (PP), tetrafluoroethylene perfluoroalkylvinyl ether copolymer (PFA) or the like, for example. Materials for forming the upper insulating members 31, 41 and the lower insulating members 50, 60 may, provided that the materials have an electrical insulating property, not be organic insulating materials such as a resin, and be inorganic insulating materials such as mica, ceramics, and glasses. In this specification, the lower insulating members 50, 60 are one example of the insulating members.

The positive electrode current collecting member 70 and the negative electrode current collecting member 80 respectively include: one rectangular plate-like base portion 71, 81; and two leg portions 72, 82 which extend from the base portion 71, 81 in a direction substantially perpendicular to the base portion 71, 81. The base portion 71, 81 may be integrally formed with the leg portions 72, 82 by integral molding or the like, and may be formed as a member separate from the leg portions 72, 82. A through hole 71a which allows the shaft portion 30b of the positive electrode terminal 30 to pass therethrough is formed in the base portion 71, and a through hole 81a which allows the shaft portion 40b of the negative electrode terminal 40 to pass therethrough is formed in the base portion 81. The positive electrode current collecting member 70 and the negative electrode current collecting member 80 are made of the same material as the positive electrode base material and the negative electrode base material of the electrode assembly 20. However, the materials for forming the positive electrode current collecting member 70 and the negative electrode current collecting member 80 are not limited to such materials. The leg portions 72, 82 are connected to the electrode assembly 20.

The terminal body 30a of the positive electrode terminal 30, the upper insulating member 31, the lid body 12, the lower insulating member 50, and the base portion 71 of the positive electrode current collecting member 70 are disposed in an overlapping manner in this order. The shaft portion 30b of the positive electrode terminal 30 passes through the upper insulating member 31, a through hole 12d formed in the lid body 12, the through hole 51 formed in the lower insulating member 50, and the through hole 71a formed in the base portion 71, and is joined to the base portion 71. The terminal body 40a of the negative electrode terminal 40, the upper insulating member 41, the lid body 12, the lower insulating member 60, and the base portion 81 of the negative electrode current collecting member 80 are disposed in an overlapping manner in this order. The shaft portion 40b of the negative electrode terminal 40 passes through the upper insulating member 41, a through hole 12e formed in the lid body 12, the through hole 61 formed in the lower insulating member 60, and the through hole 81a formed in the base portion 81, and is joined to the base portion 81. As a result, the positive electrode terminal 30, the upper insulating member 31, the lower insulating member 50, and the positive electrode current collecting member 70 are fixed to the lid body 12, while the negative electrode terminal 40, the upper insulating member 41, the lower insulating member 60, and the negative electrode current collecting member 80 are fixed to the lid body 12. Further, the positive electrode terminal 30 and the positive electrode current collecting member 70 are physically and electrically connected to each other, while the negative electrode terminal 40 and the negative electrode current collecting member 80 are physically and electrically connected to each other. The through holes 12d, 12e are respectively positioned in the vicinity of the end portions 12ca, 12cb of the lid body 12.

In this embodiment, the shaft portion 30b is joined to the base portion 71 by swaging, while the shaft portion 40b is joined to the base portion 81 by swaging. In joining by swaging, circular cylindrical distal end portions of the shaft portions 30b, 40b which project from the base portions 71, 81 receive a pressing force toward the lid body 12 respectively. Accordingly, the distal end portions are plastically deformed such that the distal end portions expand radially outward in a circular shape thus forming swaged projecting portions having diameters larger than diameters of the through holes 71a, 81a. The swaged projecting portions hold the base portions 71, 81 on the lid body 12 thus fixing the base portions 71, 81 to the lid body 12. The swaged projecting portions can be formed by a spin-swaging method, for example, where the distal end portions of the shaft portions 30b, 40b are pressed by a rotating jig so that the distal end portions of the shaft portions 30b, 40b are deformed radially outward. The swaged projecting portions may be formed by a press-swaging method where the distal end portions of the shaft portions 30b, 40b are collapsed by pressing. The shaft portions 30b, 40b may be formed of a solid circular column.

The shaft portion 30b, 40b and the base portion 71, 81 may be connected to each other by a joining method other than swaging. For example, joining by fitting, joining by thread engagement, joining by screw fastening using screws, joining by welding or the like may be adopted.

Two lid engaging portions 12*fa*, 12*fb* are formed in the lid body 12 at positions in the vicinity of the through hole 12*d*, and two lid engaging portions 12*ga*, 12*gb* are formed in the lid body 12 at positions in the vicinity of the through hole 12*e*. The lid engaging portions 12*fa*, 12*fb* are disposed on both sides of the through hole 12*d* in the X axis direction, and the lid engaging portion 12*fa* is positioned between the end portion 12*ca* and the through hole 12*d*. The lid engaging portions 12*ga*, 12*gb* are disposed on both sides of the through hole 12*e* in the X axis direction, and the lid engaging portion 12*ga* is positioned between the end portion 12*cb* and the through hole 12*e*. All lid engaging portions 12*fa*, 12*fb*, 12*ga*, 12*gb* are respectively formed of a protrusion projecting in the Z axis negative direction. Due to the formation of these lid engaging portions 12*fa*, 12*fb*, 12*ga*, 12*gb*, recessed portions which are indented in the Z axis negative direction are formed on the outer surface 12*a* of the lid body 12, and projecting portions which project in the Z axis negative direction are formed on the inner surface 12*b* of the lid body 12. The lid engaging portions 12*fa*, 12*fb*, 12*ga*, 12*gb* having the above-mentioned configuration can be formed by half blanking which is one of blanking methods in metal working, for example. The lid engaging portions 12*fa*, 12*fb*, 12*ga*, 12*gb* may be formed in steps of manufacturing a plate member for forming the lid body 12.

Two protrusions formed on the upper insulating member 31 are engaged with the recessed portions of the lid engaging portions 12*fa*, 12*fb*, and two protrusions formed on the upper insulating member 41 are engaged with the recessed portions of the lid engaging portions 12*ga*, 12*gb*. With such a configuration, the rotation of the upper insulating members 31, 41 relative to the lid body 12 about the shaft portions 30*b*, 40*b* can be suppressed.

The projecting portions of the lid engaging portions 12*fa*, 12*fb* are engaged with recessed portions (hereinafter also referred to as receiving portions) 52, 53 formed on the lower insulating member 50 respectively by fitting engagement. The receiving portions 52, 53 are disposed on both sides of the through hole 51 in the X axis direction which is a longitudinal direction of the rectangular-shaped lower insulating member 50. The receiving portions 52, 53 are indented in the Z axis negative direction which is a direction perpendicular to a surface of the lower insulating member 50. The projecting portions of the lid engaging portions 12*ga*, 12*gb* are respectively engaged with recessed portions (hereinafter also referred to as receiving portions) 62, 63 formed on the lower insulating member 60 by fitting engagement. The receiving portions 62, 63 are disposed on both sides of the through hole 61 in the X axis direction which is a longitudinal direction of the rectangular-shaped lower insulating member 60. The receiving portions 62, 63 are indented in the Z axis negative direction which is a direction perpendicular to a surface of the lower insulating member 60. With such a configuration, the rotation of the lower insulating members 50, 60 relative to the lid body 12 about the shaft portions 30*b*, 40*b* can be suppressed. In this specification, the projecting portions of the lid engaging portions 12*fa*, 12*fb*, 12*ga*, 12*gb* are one example of the projecting portion of a second locking portion.

Figure 5:
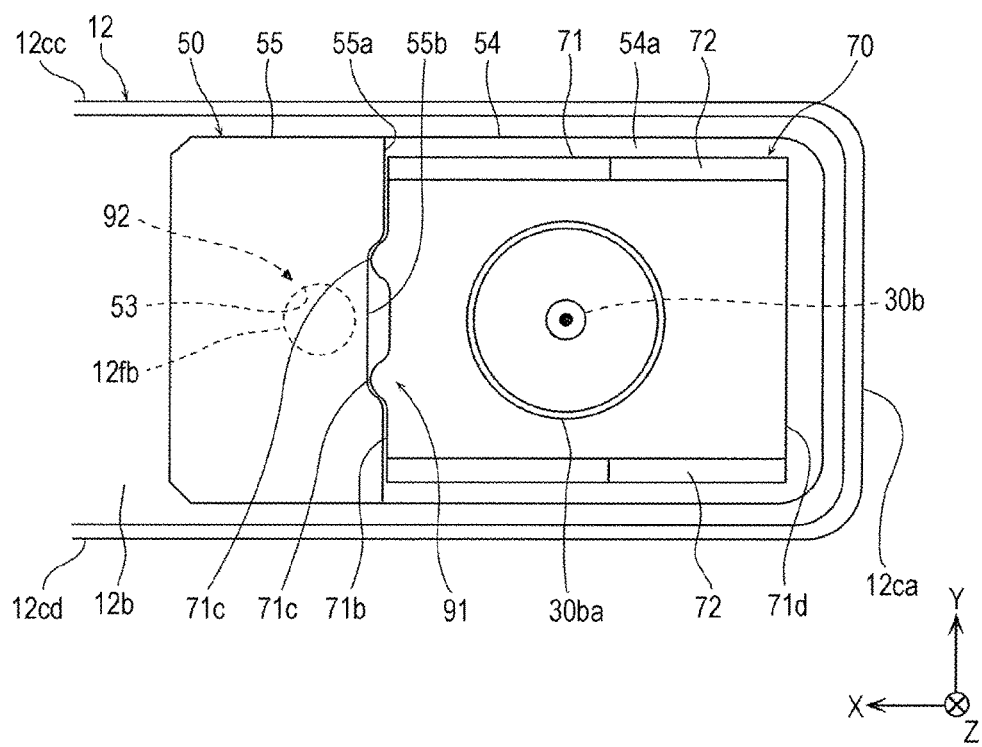
FIG. 5 is a plan view showing an inner surface of a lid body in FIG. 2, and is a view showing a positive electrode current collecting member and constitutional elements around the positive electrode current collecting member.

Hereinafter, the configuration of the positive electrode current collecting member 70 and the constitutional elements around the positive electrode current collecting member 70 is described in detail with reference to FIG. 4 and FIG. 5. The negative electrode current collecting member 80 and the constitutional elements around the negative electrode current collecting member 80 have substantially the same configuration as the positive electrode current collecting member 70 and the constitutional elements around the positive electrode current collecting member 70 and hence, in the description made hereinafter, the detailed description of the negative electrode current collecting member 80 and the constitutional elements around the negative electrode current collecting member 80 is omitted. FIG. 5 is a plan view of the inner surface 12*b* of the lid body 12 shown in FIG. 2 as viewed in the Z axis direction, and is a view showing the positive electrode current collecting member 70 and the constitutional elements around the positive electrode current collecting member 70.

The lower insulating member 50 includes: a rectangular plate-like first portion 54; and a rectangular plate-like second portion 55 having a larger thickness than the first portion 54 in the Z axis direction as integral parts thereof. The first portion 54 and the second portion 55 are disposed adjacently to each other in the X axis direction, and the first portion 54 is positioned closer to the end portion 12*ca* of the lid body 12 than the second portion 55 is. The first portion 54 and the second portion 55 jointly form a flat surface which is brought into contact with the inner surface 12*b* of the lid body 12, and the second portion 55 projects more in the Z axis negative direction toward a direction opposite to the inner surface 12*b* than the first portion 54 does. The through hole 51 which penetrates the first portion 54 in the Z axis direction is formed in the first portion 54. The receiving portion 52 (hereinafter also referred to as a first receiving portion) is disposed on a surface of the first portion 54 which faces the inner surface 12*b*, and the receiving portion 53 (hereinafter also referred to as a second receiving portion) is disposed on a surface of the second portion 55 which faces the inner surface 12*b*. The shaft portion 30*b* of the positive electrode terminal 30 passes through the through hole 51 and extends in the Z axis negative direction, and has a swaged projecting portion 30*ba* on a distal end thereof.

The second portion 55 has a flat end surface 55*a* which is positioned at a boundary between the second portion 55 and the first portion 54 and is raised upright from a surface 54*a* of the first portion 54. The end surface 55*a* extends in a direction which intersects with the X axis direction which is a longitudinal direction of the lower insulating member 50. Although the end surface 55*a* is not limited to such a configuration, in this embodiment, the end surface 55*a* extends in the Y axis direction which is substantially perpendicular to the longitudinal direction of the lower insulating member 50. The end surface 55*a* is positioned away from the through hole 51 and the swaged projecting portion 30*ba* in the X axis positive direction.

The second portion 55 has one recessed portion 55*b* on the end surface 55*a*. In this embodiment, the recessed portion 55*b* is disposed at the center of the end surface 55*a* in the Y axis direction. However, the position of the recessed portion 55*b* is not limited to such a position. The recessed portion 55*b* is indented in a direction which intersects with the shaft portion 30*b* from the end surface 55*a* and also in a direction away from the shaft portion 30*b* and the through hole 51. To be more specific, the recessed portion 55*b* is indented away from the shaft portion 30*b* and the through hole 51 with respect to the X axis direction which is a longitudinal direction of the lower insulating member 50.

The base portion 71 of the positive electrode current collecting member 70 is disposed on the surface 54*a* of the first portion 54 of the lower insulating member 50, and is fixed to the lid body 12 together with the lower insulating member 50 by the shaft portion 30*b* of the positive electrode terminal 30. One straight-line edge 71*b* of the rectangular plate-like base portion 71 faces the end surface 55*a* and the recessed portion 55*b* of the second portion 55, and is positioned close to the end surface 55*a*. The edge 71*b* is positioned away from the through hole 71*a* and the swaged projecting portion 30*ba* in the X axis positive direction.

The base portion 71 includes two projecting portions 71*c* on the edge 71*b* as integral parts thereof. The respective projecting portions 71*c* project from the edge 71*b* in a direction which intersects with the shaft portion 30*b* and in a direction away from the shaft portion 30*b* and the through hole 71*a*. To be more specific, the respective projecting portions 71*c* project in the X axis direction which is a longitudinal direction of the base portion 71 and in the direction away from the shaft portion 30*b* and the through hole 71*a*. Two projecting portions 71*c* are disposed in a spaced-apart manner from each other in the Y axis direction along the edge 71*b*. Further, two projecting portions 71*c* are formed and disposed such that both projecting portions 71*c* are accommodated in the recessed portion 55*b*.

In a state where two projecting portions 71*c* are accommodated in the recessed portion 55*b*, two projecting portions 71*c* are positioned closer to the shaft portion 30*b* than the recessed portion 55*b* is. Both two projecting portions 71*c* may be brought into contact with a wall surface of the recessed portion 55*b* in a direction which intersects with the shaft portion 30*b*, and one or both of the projecting portions 71*c* may not be brought into contact with the wall surface of the recessed portion 55*b*. The above-mentioned direction which intersects with the shaft portion 30*b* is a direction extending along an XY plane and is also a circumferential direction about the shaft portion 30*b*. In the case where one or neither of the projecting portions 71*c* is brought into contact with the wall surface of the recessed portion 55*b*, it is preferable that, when the base portion 71 is slightly rotated about the shaft portion 30*b* with respect to the lower insulating member 50, the projecting portions 71*c* be brought into contact with the wall surface of the recessed portion 55*b* so that the rotation of the base portion 71 be prevented. In a case where both projecting portions 71*c* are brought into contact with the wall surface of the recessed portion 55*b*, the wall surface of the recessed portion 55*b* locks the projecting portions 71*c* so as to prevent the base portion 71 from being rotated. These two projecting portions 71*c* and recessed portion 55*b* form a first locking portion 91 which locks the base portion 71 in a rotational direction.

Two projecting portions 71*c* are disposed in a spaced-apart manner from each other in the Y axis direction and hence, both two projecting portions 71*c* may be disposed in a displaced manner from the center of the edge 71*b* in the Y axis direction. A distance between the projecting portion 71*c* disposed at such a position and the shaft portion 30*b* is larger than a distance between the projecting portion 71*c* and the shaft portion 30*b* in a case where the projecting portion 71*c* is positioned at the center of the edge 71*b*. In a case where the base portion 71 is rotated about the shaft portion 30*b* with respect to the lower insulating member 50 and the projecting portion 71*c* is brought into contact with the wall surface of the recessed portion 55*b* thus pushing the wall surface, the larger a distance between a contact portion and the shaft portion 30*b*, the smaller a force acting on the wall surface becomes. Accordingly, the larger the distance between two projecting portions 71*c*, a low level a force acting on the projecting portion 71*c* and the wall surface of the recessed portion 55*b* can be suppressed. Thus, the configuration of the projecting portions 71*c* and the recessed portion 55*b* for locking the rotation of the base portion 71 can be made small in size.

The above-mentioned first locking portion 91 is disposed at a position more away from the end portion 12*ca* of the lid body 12 than the shaft portion 30*b* and prevents the rotation of the base portion 71 relative to the lower insulating member 50.

Figure 6:
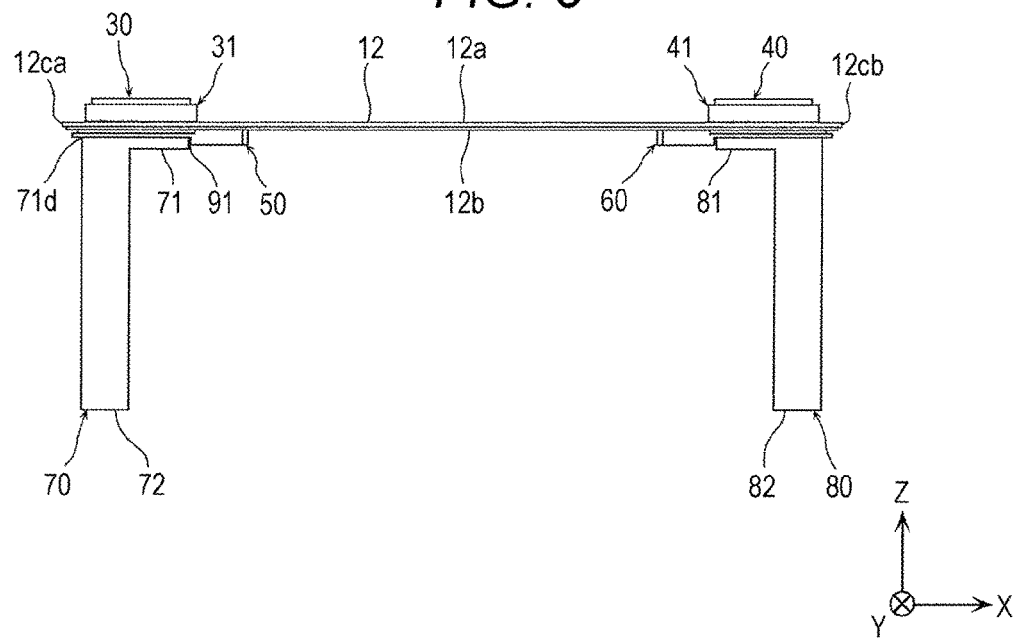
FIG. 6 is a side view of the lid body and constitutional elements around the lid body in FIG. 2 as viewed in a side view.

With reference to FIG. 4, FIG. 5 and FIG. 6, in the positive electrode current collecting member 70, two leg portions 72 are disposed adjacently to an edge 71*d* of the base portion 71 on a side opposite to the edge 71*b*. To be more specific, proximal portions of two leg portions 72 on the base portion 71 are disposed adjacently to the straight-line edge 71*d*. FIG. 6 is a side view of the lid body 12 and the constitutional elements around the lid body 12 shown in FIG. 2 as viewed from a side in the Y axis positive direction. The edge 71*d* is an edge which is closest to the end portion 12*ca* of the lid body 12 out of edges of the base portion 71, and extends along the end portion 12*ca*. Each leg portion 72 extends from the base portion 71 substantially perpendicular to the base portion 71. To be more specific, each leg portion 72 extends in a straight manner in the Z-axis negative direction. Accordingly, two leg portions 72 are positioned closer to the end portion 12*ca* of the lid body 12 in the X axis direction which is a longitudinal direction of the lid body 12 than the first locking portion 91 is. Such a first locking portion 91 does not project more toward the end portion 12*ca* than two leg portions 72 do. That is, the first locking portion 91 does not project from two leg portions 72 in the X axis negative direction. With such a configuration, a space defined between the leg portions 72 and the end portion 12*ca* can be made small.

With reference to FIG. 3 to FIG. 5, between the lower insulating member 50 and the lid body 12, the second receiving portion 53 of the lower insulating member 50 and the lid engaging portion 12*fb* of the lid body 12 are engaged with each other in a direction which intersects with the shaft portion 30*b*, to be more specific, in a direction along the XY plane thus preventing the rotation of the lower insulating member 50 relative to the lid body 12 about the shaft portion 30*b*. The second receiving portion 53 and the lid engaging portion 12*fb* described above form a second locking portion 92 which locks the lower insulating member 50 in a rotational direction. Further, the first receiving portion 52 of the lower insulating member 50 and the lid engaging portion 12*fa* of the lid body 12 are also engaged with each other in a direction which intersects with the shaft portion 30*b* thus preventing the rotation of the lower insulating member 50 relative to the lid body 12. With such a configuration, a second locking portion 92 is formed. Accordingly, two second locking portions 92 are provided. The lid engaging portions 12*fb*, 12*fa* extend substantially parallel to the shaft portion 30*b*.

Due to the provision of the above-mentioned first locking portion 91 and the second locking portions 92, the rotation of the lower insulating member 50 and the rotation of the base portion 71 relative to the lid body 12 are locked. For example, when the swaged projecting portion 30*ba* is formed on the shaft portion 30*b* by a spin-swaging method, although the lower insulating member 50 and the base portion 71 respectively receive a rotational force, the first locking portion 91 and the second locking portions 92 prevent the rotation of the lower insulating member 50 and the rotation of the base portion 70.

With reference to FIG. 5, when two projecting portions 71*c* of the base portion 71 are accommodated in the recessed portion 55*b* of the lower insulating member 50, the edge 71*b* of the base portion 71 may be brought into contact with the end surface 55*a* of the second portion 55 or a slight gap (also referred to as a space) may be formed between the edge 71*b* of the base portion 71 and the end surface 55*a*. In the case where the gap is formed between the edge 71*b* and the end surface 55*a*, even when a tolerance relating to manufacture such as a manufacture tolerance of the lower insulating member 50 and the base portion 71 or an assembling tolerance between the lower insulating member 50 and the base portion 71 exists, the base portion 71 can be smoothly assembled to the lower insulating member 50 at a predetermined position while suppressing interference between the base portion 71 and the second portion 55. Further, when the shaft portion 30*b* is joined by swaging, there may be a case where the base portion 71 which receives a pressing force is deformed in an extending manner in a direction along the XY plane. However, since the gap is formed between the edge 71*b* and the end surface 55*a*, it is possible to suppress the occurrence of a phenomenon that the deformed base portion 71 presses the end surface 55*a* of the second portion 55 so that the second portion 55 is deformed or damaged.

As has been described above, the energy storage device 100 according to this embodiment includes the first locking portion 91 which locks the rotation of the positive electrode current collecting member 70 with respect to the lower insulating member 50 about the shaft portion 30*b* of the positive electrode terminal 30. The first locking portion 91 includes: the recessed portion 55*b* formed on the lower insulating member 50; and the projecting portions 71*c* formed on the positive electrode current collecting member 70. Further, the recessed portion 55*b* is indented in a direction which intersects with the shaft portion 30*b* and in a direction away from the shaft portion 30*b*. The projecting portions 71*c* project in a direction which intersects with the shaft portion 30*b* and in a direction away from the shaft portion 30*b*. The recessed portion 55*b* and the projecting portions 71*c* are engaged with each other. The leg portions 72 are positioned closer to the end portion 12*ca* in the longitudinal direction of the lid body 12 than the first locking portion 91 is.

In the above-mentioned configuration, the first locking portion 91 can prevent the rotation of the positive electrode current collecting member 70 relative to the lower insulating member 50 about the shaft portion 30*b* using the simple configuration formed of the recessed portion 55*b* of the lower insulating member 50 and the projecting portions 71*c* of the positive electrode current collecting member 70. Further, the first locking portion 91 is disposed such that the first locking portion 91 does not project from the leg portions 72 of the positive electrode current collecting member 70 toward the end portion 12*ca* of the lid body 12 and hence, the positive electrode current collecting member 70 can be disposed in the container 10 such that the leg portions 72 is disposed close to the position of the end portion 12*ca* in the longitudinal direction of the lid body 12. With such a configuration, a volume which the electrode assembly 20 occupies in the container 10 can be increased and hence, energy density of the energy storage device 100 is increased. That is, an energy storage capacity of the energy storage device 100 is increased. Further, the lower insulating member 60 and the negative electrode current collecting member 80 also have substantially the same configuration described above and can acquire substantially the same advantageous effect described above. Accordingly, a distance between the leg portions 72 of the positive electrode current collecting member 70 and the leg portions 82 of the negative electrode current collecting member 80 can be increased so that an energy storage region of the electrode assembly 20 can be increased.

In the energy storage device 100 according to the embodiment, the first locking portion 91 is disposed on at least one of edges 71*b*, 71*d* on both ends of the positive electrode current collecting member 70 in the longitudinal direction of the lid body 12, specifically, on the edge 71*b*. Due to the above-mentioned configuration, the first locking portion 91 suppresses the increase of a width of the positive electrode current collecting member 70 and a width of the lower insulating member 50 in the lateral direction perpendicular to the longitudinal direction of the lid body 12. Since the first locking portion 91 is disposed on the edge 71*b*, a distance between the first locking portion 91 and the shaft portion 30*b* can be increased. Accordingly, a force acting on the first locking portion 91 at the time of locking is decreased and hence, the structure of the first locking portion 91 can be miniaturized. The lower insulating member 60 and the negative electrode current collecting member 80 also have substantially the same configuration as described above and can acquire substantially the same advantageous effect as described above.

In the energy storage device 100 according to the embodiment, the second locking portions 92 lock the rotation of the lower insulating member 50 about the shaft portion 30*b* relative to the lid body 12. The second locking portions 92 include the lid engaging portions 12*fa*, 12*fb* which form projecting portions projecting from the lid body 12 in a direction parallel to the shaft portion 30*b*, and the receiving portions 52, 53 which are formed on the lower insulating member 50 and are engaged with the lid engaging portions 12*fa*, 12*fb* respectively. The lid engaging portions 12*fa*, 12*fb* and the receiving portions 52, 53 are respectively engaged with each other. Due to the above-mentioned configuration, the second locking portions 92 can prevent the rotation of the lower insulating member 50 relative to the lid body 12 about the shaft portion 30*b* by the simple configuration formed of the lid engaging portions of the lid body 12 and the receiving portions of the lower insulating member 50. Further, the rotation of the lower insulating member 50 and the rotation of the positive electrode current collecting member 70 relative to the lid body 12 can be prevented. The lower insulating member 60 and the negative electrode current collecting member 80 also have substantially the same configuration as described above and acquire substantially the same advantageous effect as described above.

In the first locking portion 91 of the energy storage device 100 according to the embodiment, a gap is formed between a portion of the first locking portion 91 around the projecting portions 71*c* formed on the positive electrode current collecting member 70 and a portion of the first locking portion 91 around the recessed portion 55*b* formed on the lower insulating member 50. Due to the above-mentioned configuration, even when a tolerance relating to manufacture exists in the lid body 12, the lower insulating member 50 and the positive electrode current collecting member 70, the positive electrode current collecting member 70 can be disposed at a predetermined position while suppressing the interference between the portions around the projecting portions 71*c* and the portion around the recessed portion 55*b*. For example, even when the positive electrode current collecting member 70 is deformed at the time of connecting the positive electrode current collecting member 70 and the positive electrode terminal 30 to each other, a contact between the positive electrode current collecting member 70 and the portion around the recessed portion 55*b* can be suppressed so that the deformation or a damage of the portion around the recessed portion 55b can be suppressed. The lower insulating member 60 and the negative electrode current collecting member 80 also have substantially the same configuration described above and can acquire substantially the same advantageous effect described above.

[Modification 1]

Figure 7:
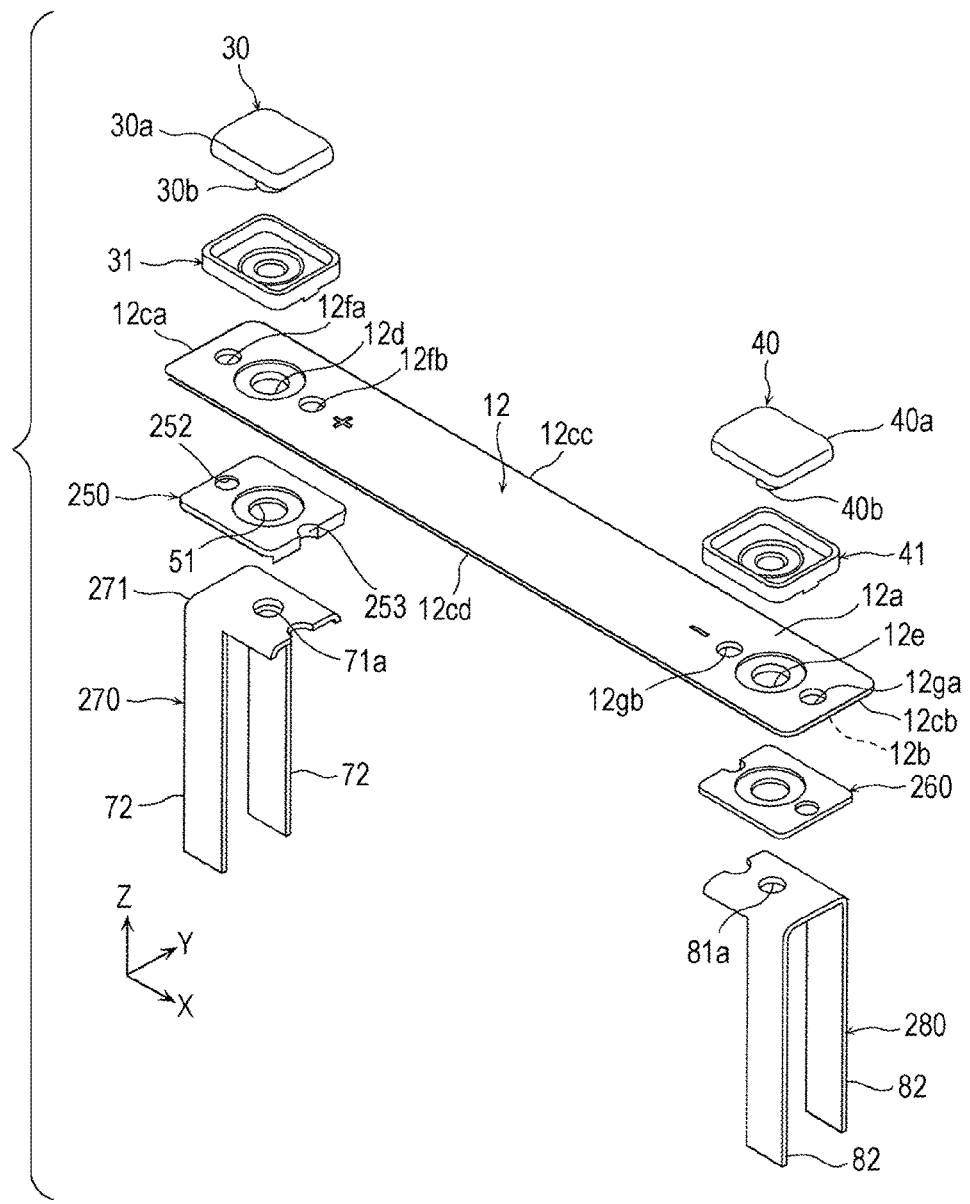
FIG. 7 is an exploded perspective view showing a positive electrode terminal, a negative electrode terminal, and constitutional elements around the positive electrode terminal and the negative electrode terminal of an energy storage device according to a modification 1.
Figure 8:
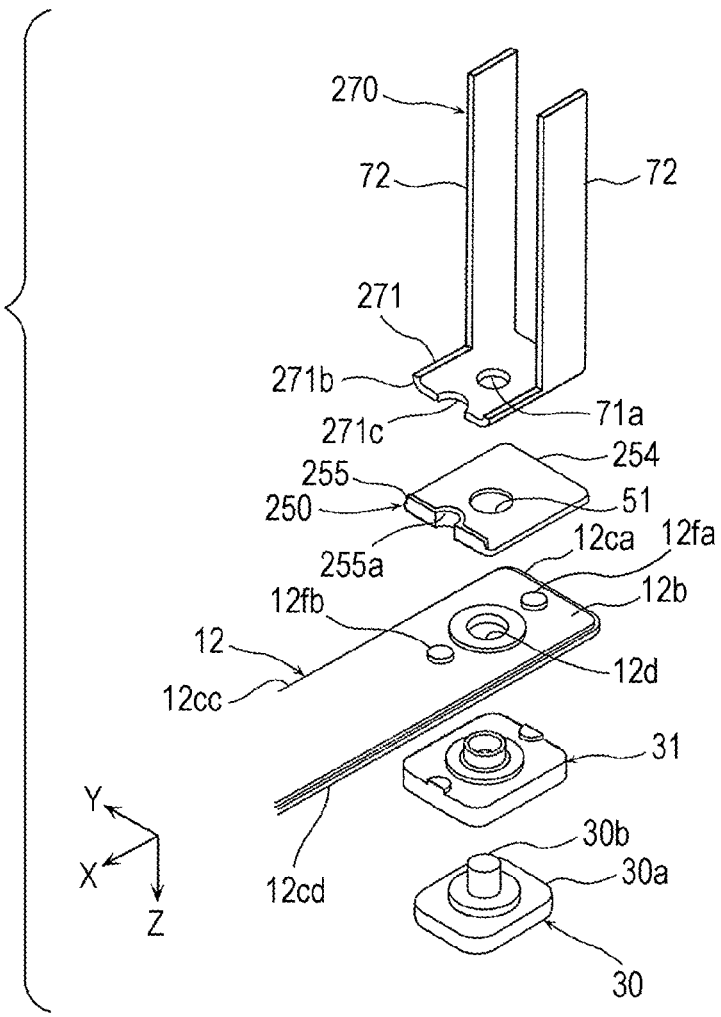
FIG. 8 is an exploded perspective view showing the positive electrode terminal and the constitutional elements around the positive electrode terminal in FIG. 7.
Figure 9:
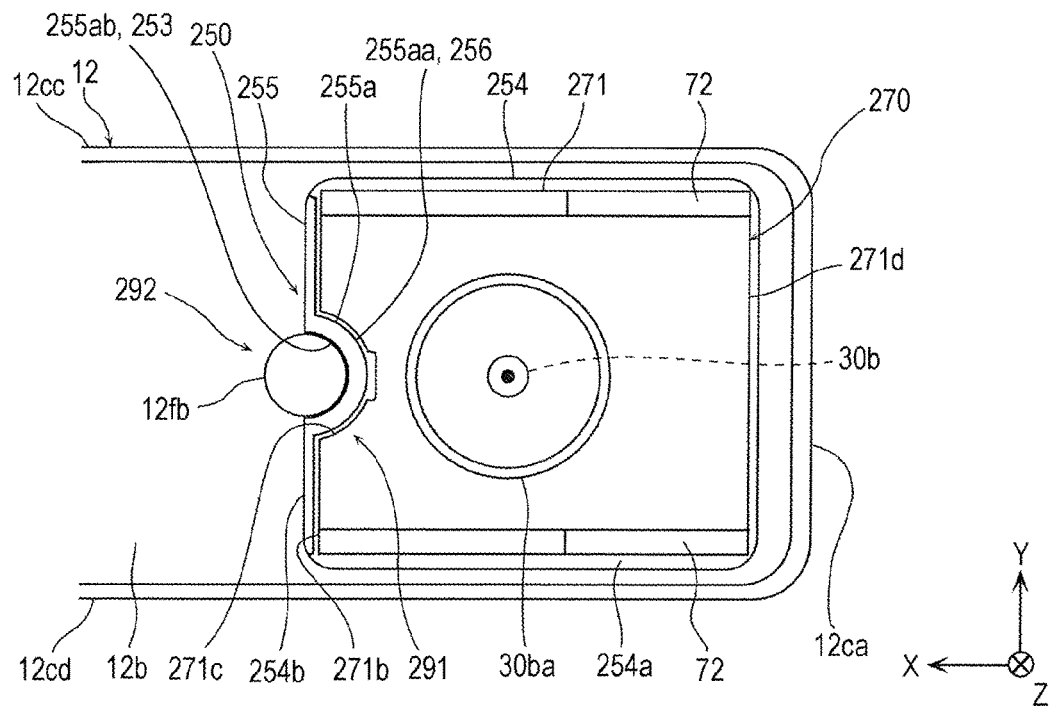
FIG. 9 is a plan view showing an inner surface of a lid body of the energy storage device according to the modification 1, and is a view showing a positive electrode current collecting member and constitutional elements around the positive electrode current collecting member.

Hereinafter, an energy storage device according to a modification 1 of the embodiment is described with reference to FIG. 7 to FIG. 9. FIG. 7 is an exploded perspective view showing a positive electrode terminal 30 and a negative electrode terminal 40 of the energy storage device according to the modification 1, and constitutional elements around the positive electrode terminal 30 and the negative electrode terminal 40 in the same manner as FIG. 3. FIG. 8 is an exploded perspective view of the positive electrode terminal 30 and the constitutional elements around the positive electrode terminal 30 shown in FIG. 7 in the same manner as FIG. 4. FIG. 9 is a plan view of an inner surface 12b of a lid body 12 of the energy storage device according to the modification 1, and is a view showing a positive electrode current collecting member 270 and constitutional elements around the positive electrode current collecting member 270 in the same manner as FIG. 5. In this modification 1, the description of points substantially equal to the corresponding points of the above-mentioned embodiment is omitted. The energy storage device according to the modification 1 differs from the energy storage device according to the above-mentioned embodiment with respect to a point that a first locking portion and a second locking portion are integrally formed with each other. Also in this modification, the description is made only with respect to the configuration relating to the positive electrode terminal out of the positive electrode terminal and the negative electrode terminal which have substantially the same configuration.

As shown in FIG. 7 and FIG. 8, the energy storage device according to the modification 1 includes a lower insulating member 250 and a positive electrode current collecting member 270 which are fixed to a lid body 12 together with the positive electrode terminal 30 and an upper insulating member 31. In the same manner, the energy storage device according to the modification 1 includes a lower insulating member 260 and a negative electrode current collecting member 280 which are fixed to the lid body 12 together with the negative electrode terminal 40 and an upper insulating member 41. As described above, the description with respect to the lower insulating member 260 and the negative electrode current collecting member 280 is omitted.

In the rectangular plate-like lower insulating member 250, a first receiving portion 252 and a second receiving portion 253 are formed on both sides of a through hole 51. The first receiving portion 252 and the second receiving portion 253 are respectively formed of a recessed portion. In the X axis direction, the first receiving portion 252 is disposed closer to an end portion 12ca of the lid body 12 than the through hole 51 is, and the second receiving portion 253 is disposed remoter from the end portion 12ca than the through hole 51 is. The first receiving portion 252 is indented in the Z axis negative direction from a surface of the lower insulating member 250, and a lid engaging portion 12fa is fitted in the first receiving portion 252. The second receiving portion 253 is indented in the X axis negative direction on an edge of the lower insulating member 250 in the X axis positive direction, and a lid engaging portion 12fb is fitted in the second receiving portion 253.

As shown in FIG. 8 and FIG. 9, the lower insulating member 250 includes a rectangular plate-like body 254, and the first receiving portion 252, the through hole 51 and the second receiving portion 253 are formed on the body 254. The body 254 includes a strip-shaped end wall portion 255 positioned on a side opposite to the end portion 12ca of the lid body 12 with respect to the shaft portion 30b of the positive electrode terminal 30 as an integral part thereof such that the end wall portion 255 extends along the edge 254b and is raised upright from the edge 254b. The end wall portion 255 projects in the Z axis negative direction perpendicularly from a surface 254a of the body 254 on a side opposite to a surface of the body 254 on which the first receiving portion 252 is formed, that is, substantially parallel to the shaft portion 30b, and extends in a straight manner in the Y axis direction. The end wall portion 255 includes a curved portion 255a which is curved in the X axis negative direction so as to project toward the shaft portion 30b at a substantially center portion thereof in the Y axis direction. A convex surface 255aa which faces a swaged projecting portion 30ba is formed on an outer side of the curved portion 255a in the X axis negative direction, and a concave surface 255ab which faces a side of the curved portion 255a opposite to the swaged projecting portion 30ba is formed on an inner side of the curved portion 255a in the X axis positive direction. The convex surface 255aa forms a projecting portion 256 which projects toward the shaft portion 30b in a direction which intersects with the shaft portion 30b, specifically, in a direction along the XY plane. The concave surface 255ab forms the second receiving portion 253 which is indented toward the shaft portion 30b in a direction which intersects with the shaft portion 30b, specifically, in a direction along the XY plane.

A lid engaging portion 12fb of the lid body 12 is fitted in the second receiving portion 253. In this modification 1, the curved portion 255a which forms the second receiving portion 253 is positioned closer to the shaft portion 30b than the lid engaging portion 12fb is. The lid engaging portion 12fb and the concave surface 255ab are engaged with each other in a direction which intersects with the shaft portion 30b, specifically, in a direction along the XY plane. The second receiving portion 253 and the lid engaging portion 12fb form a second locking portion 292. The second locking portion 292 locks the lower insulating member 250 with respect to the lid body 12 in a rotational direction about the shaft portion 30b due to the engagement of the second receiving portion 253 and the lid engaging portion 12fb.

A rectangular plate-like base portion 271 of the positive electrode current collecting member 270 is disposed on the surface 254a of the body 254 of the lower insulating member 250. One straight-line edge 271b of the base portion 271 is positioned close to the end wall portion 255 and faces the end wall portion 255. The edge 271b is positioned away from the swaged projecting portion 30ba in the X axis positive direction. A recessed portion 271c which is indented toward the shaft portion 30b in a direction which intersects with the shaft portion 30b, specifically, in a direction along the XY plane is formed on a substantially center portion of the edge 271b in the Y axis direction. The convex surface 255aa of the end wall portion 255, that is, the projecting portion 256 is fitted in the recessed portion 271c. In such a state, the recessed portion 271c is positioned closer to the shaft portion 30b than the projecting portion 256 is. Further, a gap may be or may not be formed between the edge 271b of the base portion 271 and the end wall portion 255.

The recessed portion 271c and the projecting portion 256 form a first locking portion 291. The recessed portion 271c and the projecting portion 256 are engaged with each other in a direction which intersects with the shaft portion 30b, specifically, in a direction along the XY plane. The first locking portion 291 locks the base portion 271 with respect to the lower insulating member 250 in a rotational direction about the shaft portion 30b due to the engagement of the recessed portion 271c and the projecting portion 256. Accordingly, the curved portion 255a of the end wall portion 255 of the lower insulating member 250 functions as constitutional elements of the first locking portion 291 and the second locking portion 292 so that the first locking portion 291 and the second locking portion 292 are integrally formed with each other by way of the curved portion 255a.

In the positive electrode current collecting member 270, proximal portions of two leg portions 72 are positioned adjacently to an edge 271d of the base portion 271 on a side opposite to the edge 271b of the base portion 271. Accordingly, two leg portions 72 are positioned closer to the end portion 12ca of the lid body 12 in the X axis direction which is a longitudinal direction of the lid body 12 than the first locking portion and the second locking portion are.

Other configurations of the energy storage device according to the modification 1 are substantially equal to the corresponding configurations of the energy storage device 100 according to the embodiment and hence, the description of such configurations is omitted. Further, the energy storage device according to the modification 1 can acquire substantially the same advantageous effects as the energy storage device 100 according to the embodiment.

[Modification 2]

Figure 10:
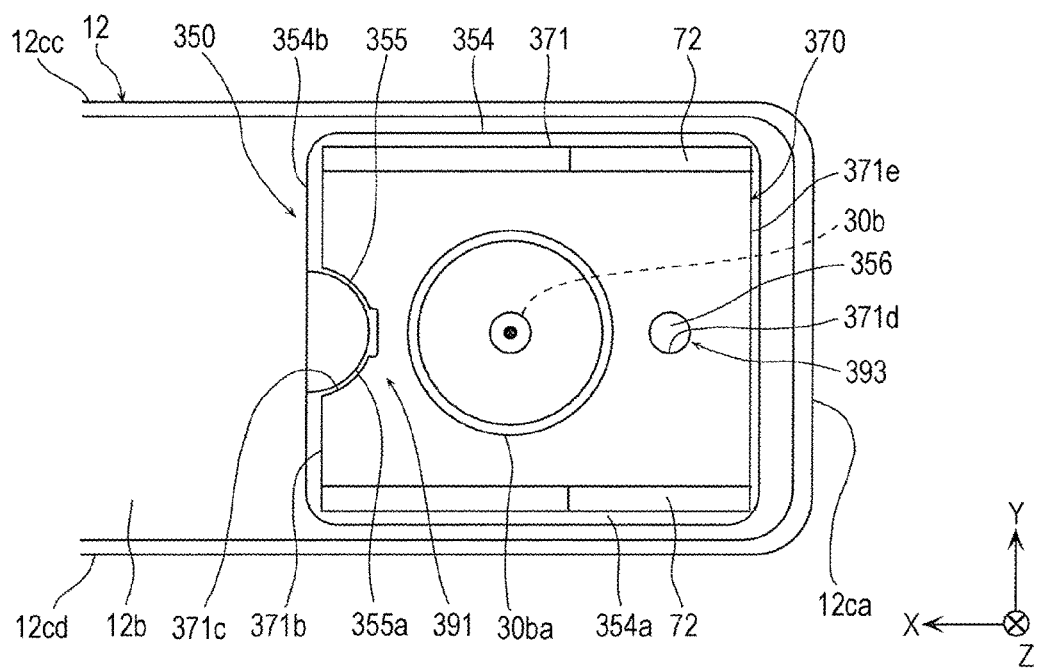
FIG. 10 is a plan view showing an inner surface of a lid body of an energy storage device according to a modification 2, and is a view showing a positive electrode current collecting member and constitutional elements around the positive electrode current collecting member.

Hereinafter, an energy storage device according to a modification 2 of the embodiment is described with reference to FIG. 10. FIG. 10 is a plan view of an inner surface 12b of the lid body 12 of the energy storage device according to the modification 2, and is a view showing a positive electrode current collecting member 370 and constitutional elements around the positive electrode current collecting member 370 in the same manner as FIG. 5. In the modification 2, the description with respect to points which are substantially equal to the embodiment and the modification 1 is omitted. The energy storage device according to the modification 2 is configured such that, in the energy storage device according to the modification 1, the first locking portion is formed as a part independent from the second locking portion. Also in this modification, the description is made only with respect to the configuration relating to a positive electrode terminal out of the positive electrode terminal and a negative electrode terminal which have substantially the same configuration.

A rectangular plate-like lower insulating member 350 of the energy storage device according to the modification 2 includes a rectangular plate-like body 354. The body 354 includes an engaging protrusion 355 as an integral part thereof in the vicinity of the center of a straight-line edge 354b positioned on a side opposite to an end portion 12ca of a lid body 12 with respect to a shaft portion 30b of a positive electrode terminal 30. The engaging protrusion 355 projects perpendicularly from a surface 354a of the body 354 on a side opposite to a surface of the body 354 which faces the lid body 12, that is, in the Z axis negative direction substantially parallel to the shaft portion 30b. The engaging protrusion 355 has a semicircular columnar shape, and has a semicircular shape as viewed in a plan view from the inner surface 12b of the lid body 12. The engaging protrusion 355 forms a convex surface 355a which is formed as a curved surface projecting toward the shaft portion 30b in a direction which intersects with the shaft portion 30b, specifically, in a direction along the XY plane. The body 354 includes a circular columnar-shaped protruding portion 356 as an integral part thereof at a position on a side opposite to the engaging protrusion 355 with respect to the shaft portion 30b. The protruding portion 356 projects from the surface 354a in the Z axis negative direction substantially parallel to the shaft portion 30b.

A rectangular plate-like base portion 371 of the positive electrode current collecting member 370 is disposed on the surface 354a of the body 354 of the lower insulating member 350. The base portion 371 includes, in the same manner as the base portion 271 of the positive electrode current collecting member 270 according to the modification 1, a recessed portion 371c on an edge 371b disposed adjacently to the edge 354b of the lower insulating member 350. The recessed portion 371c is indented toward the shaft portion 30b in a direction which intersects with the shaft portion 30b, specifically, in a direction along the XY plane. The convex surface 355a of the engaging protrusion 355 is fitted in the recessed portion 371c. In such a state, the recessed portion 371c is positioned closer to the shaft portion 30b than the engaging protrusion 355 is. The recessed portion 371c and the engaging protrusion 355 form a first locking portion 391.

A through hole 371d is formed in the base portion 371 at a position corresponding to the protruding portion 356 of the lower insulating member 350, and the through hole 371d penetrates the base portion 371 in a direction substantially parallel to the shaft portion 30b. The through hole 371d is positioned inside the periphery of the base portion 371. The protruding portion 356 is fitted in the through hole 371d. The through hole 371d and the protruding portion 356 are engaged with each other in a direction which intersects with the shaft portion 30b, specifically, in a direction along the XY plane. The protruding portion 356 may be strictly or loosely fitted in the through hole 371d, or may be merely inserted into the through hole 371d with a gap formed between the protruding portion 356 and the through hole 371d. The through hole 371d and the protruding portion 356 form a third locking portion 393. The third locking portion 393 locks the base portion 371 with respect to the lower insulating member 350 in a rotational direction about the shaft portion 30b due to the engagement of the through hole 371d and the protruding portion 356. Also in this modification, in the same manner as the embodiment, two second locking portions not shown in the drawing are provided between the lower insulating member 350 and the lid body 12.

In the positive electrode current collecting member 370, proximal portions of two leg portions 72 are positioned adjacently to an edge 371e of the base portion 371 on a side opposite to the edge 371b of the base portion 371. Accordingly, two leg portions 72 are positioned closer to the end portion 12ca of the lid body 12 in the X axis direction which is a longitudinal direction of the lid body 12 than the first locking portion, the second locking portions, and the third locking portion are.

Other configurations of the energy storage device according to the modification 2 are substantially equal to the corresponding configurations of the energy storage device according to the embodiment or the modification 1 and hence, the description of such configurations is omitted. Further, the energy storage device according to the modification 2 can acquire substantially the same advantageous effects as the energy storage device according to the embodiment or the modification 1. Further, in the energy storage device according to the modification 2, the lower insulating member 350 includes the protruding portion 356 which projects in a direction parallel to the shaft portion 30b of the positive electrode terminal 30, and the positive electrode current collecting member 370 includes the through hole 371*d*. Further, the protruding portion 356 is fitted in the through hole 371*d*. Due to the above-mentioned configuration, the third locking portion 393 formed of the through hole 371*d* and the protruding portion 356 can be disposed without making the third locking portion 393 project outward from the positive electrode current collecting member 370. The through hole 371*d* may be a bottomed hole which does not penetrate the base portion 371 of the positive electrode current collecting member 370. In this case, the bottomed hole opens toward the lower insulating member 350.

[Modification 3]

Figure 11:
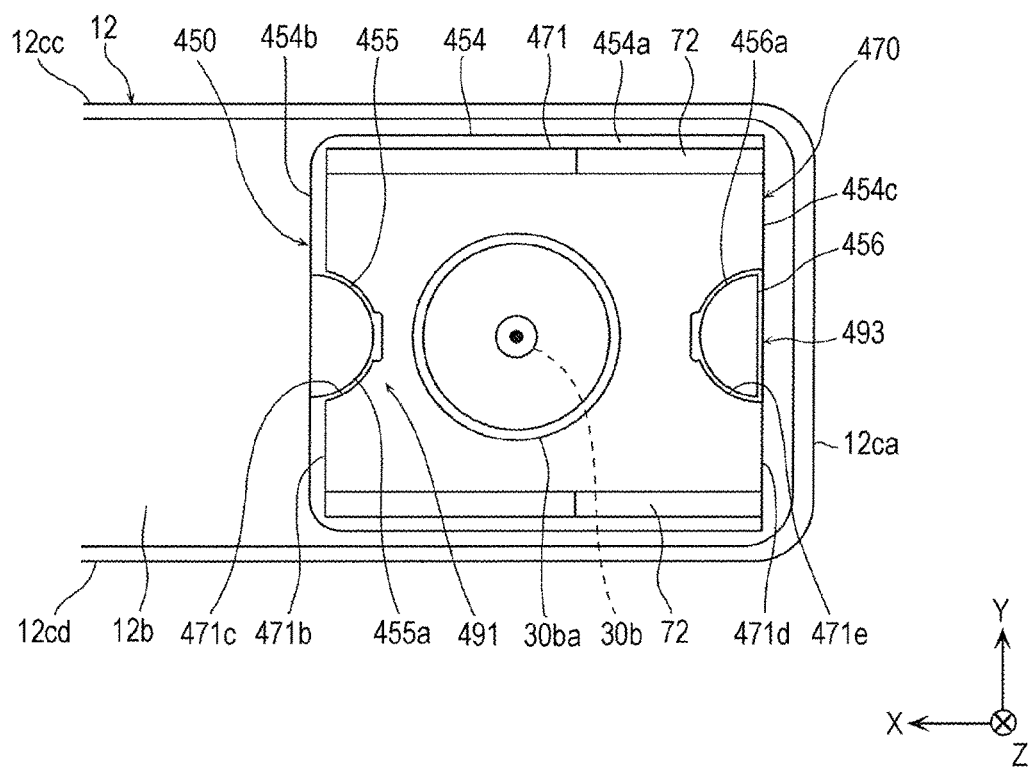
FIG. 11 is a plan view showing an inner surface of a lid body of an energy storage device according to a modification 3, and is a view showing a positive electrode current collecting member and constitutional elements around the positive electrode current collecting member.

Hereinafter, an energy storage device according to a modification 3 of the embodiment is described with reference to FIG. 11. FIG. 11 is a plan view of an inner surface 12*b* of a lid body 12 of the energy storage device according to the modification 3, and is a view showing a positive electrode current collecting member 470 and constitutional elements around the positive electrode current collecting member 470 in the same manner as FIG. 5. In the modification 3, the description relating to points substantially equal to the already described embodiment and modifications is omitted. The energy storage device according to the modification 3 is configured such that, in the energy storage device according to the modification 2, two first locking portions are disposed at positions opposite to each other. Also in this modification, the description is made only with respect to the configuration relating to a positive electrode terminal out of the positive electrode terminal and a negative electrode terminal which have substantially the same configuration.

A rectangular plate-like lower insulating member 450 of the energy storage device according to the modification 3 includes a rectangular plate-like body 454. The body 454 includes a first engaging protrusion 455 substantially equal to the engaging protrusion 355 of the energy storage device according to the modification 2 as an integral part thereof on a surface 454*a* of the body 454 on a side opposite to a surface of the body 454 which faces the lid body 12. The first engaging protrusion 455 is positioned in the vicinity of the center of an edge 454*b* of the body 454 on a side away from the end portion 12*ca* of the lid body 12. The body 454 also includes a second engaging protrusion 456 having substantially the same configuration as the first engaging protrusion 455 as an integral part thereof at a position in the vicinity of the center of an edge 454*c* disposed opposite to the edge 454*b* and close to the end portion 12*ca*. The second engaging protrusion 456 projects from a surface 454*a* in the same direction as the first engaging protrusion 455. The second engaging protrusion 456 forms a convex surface 456*a* which is formed as a curved surface projecting toward the shaft portion 30*b* of the positive electrode terminal 30 in a direction which intersects with the shaft portion 30*b*, specifically, in a direction along the XY plane. Accordingly, a convex surface 455*a* and the convex surface 456*a* face each other.

A rectangular plate-like base portion 471 of the positive electrode current collecting member 470 is disposed on the surface 454*a* of the body 454 of the lower insulating member 450. The base portion 471 has, in the same manner as the base portion 371 of the positive electrode current collecting member 370 according to the modification 2, a first recessed portion 471*c* on an edge 471*b* disposed adjacently to the edge 454*b*. Further, the base portion 471 has a second recessed portion 471*e* on an edge 471*d* on a side opposite to the edge 471*b*. The second recessed portion 471*e* is indented toward the shaft portion 30*b* in a direction which intersects with the shaft portion 30*b*, specifically, in a direction along the XY plane. The convex surface 455*a* of the first engaging protrusion 455 and the convex surface 456*a* of the second engaging protrusion 456 are fitted in the first recessed portion 471*c* and the second recessed portion 471*e* respectively. In such a state, the first recessed portion 471*c* and the second recessed portion 471*e* are positioned closer to the shaft portion 30*b* than the first engaging protrusion 455 and the second engaging protrusion 456 are respectively. The first recessed portion 471*c* and the first engaging protrusion 455 form a first locking portion 491, and the second recessed portion 471*e* and the second engaging protrusion 456 form a first locking portion 493. The first locking portions 491, 493 lock the base portion 471 with respect to the lower insulating member 450 in the rotational direction about the shaft portion 30*b*.

In the positive electrode current collecting member 470, proximal portions of two leg portions 72 are positioned adjacently to the edge 471*d* of the base portion 471. Two leg portions 72 are positioned closer to the end portion 12*ca* of the lid body 12 in the X axis direction which is a longitudinal direction of the lid body 12 than the first locking portions and the second locking portions are.

Other configurations of the energy storage device according to the modification 3 are substantially equal to the corresponding other configurations of the energy storage device according to the modification 2 and hence, the description of such configurations is omitted. Further, the energy storage device according to the modification 3 can acquire substantially the same advantageous effects as the energy storage device according to the modification 2.

[Other Modifications]

Although the description has been made with respect to the energy storage devices according to the embodiment of the present invention and the modifications of the embodiment heretofore, the present invention is not limited to the above-mentioned embodiment and modifications. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

In the energy storage devices according to the embodiment and the modifications of the embodiment, the first locking portion formed of the current collecting member of the positive electrode or the negative electrode and the lower insulating member is disposed on at least one of two end portions of the base portion of the current collecting member in the X axis direction which is a longitudinal direction of the lid body 12. However, the present invention is not limited to such a configuration. The first locking portion may be disposed on the end portion of the base portion in the Y axis direction which is a lateral direction perpendicular to the longitudinal direction of the lid body 12. Further, a planar shape of the base portion of the current collecting member is not limited to a rectangular shape, and may be any shape such as a circular shape, an elliptical shape, an elongated circular shape, other polygonal shapes, or a combination of these shapes. Still further, the edge of the base portion of the current collecting member is not limited to a straight-line edge, and may be a curved edge, a bent edge or the like. In such a case, the first locking portion may be disposed on any end portion of the base portion such as an end portion of the base portion in the longitudinal direction, and an end portion of the base portion in the lateral direction of the lid body 12 or an end portion of the base portion in a direction which intersects with the longitudinal direction or the lateral direction of the lid body 12.

In the first locking portion of the energy storage device according to the embodiment and the modifications of the embodiment, the projecting portion formed on the lower insulating body and the recessed portion formed on the current collecting member of the positive electrode or the negative electrode are configured such that the projecting portion projects and the recessed portion is indented toward the shaft portion of the electrode terminal of the positive electrode or the negative electrode respectively. Further, the recessed portion of the current collecting member is positioned closer to the shaft portion than the projecting portion of the lower insulating body is. However, the present invention is not limited to such a configuration, the projecting portion of the lower insulating body and the recessed portion of the current collecting member may be configured such that the projecting portion projects and the recessed portion is indented away from the shaft portion. In the above-mentioned configuration, for example, the projecting portion of the lower insulating body may be positioned closer to the shaft portion than the recessed portion of the current collecting member is.

In the first locking portion, the recessed portion formed on the lower insulating body and the projecting portion formed on the current collecting member are configured such that the recessed portion is indented and the projecting portion projects away from the shaft portion of the electrode terminal. Further, the projecting portion of the current collecting member is positioned closer to the shaft portion than the recessed portion of the lower insulating body is. However, the present invention is not limited to such a configuration, and the recessed portion of the lower insulating body and the projecting portion of the current collecting member may be configured such that the recessed portion is indented and the projecting portion projects toward the shaft portion respectively. In the above-mentioned configuration, for example, the recessed portion of the lower insulating body may be positioned closer to the shaft portion than the projecting portion of the current collecting member is.

In the energy storage device according to the embodiment and the modifications of the embodiment, one or two first locking portions each of which is formed of the current collecting member of the positive electrode or the negative electrode and the lower insulating member are disposed on one base portion of the current collecting member. However, the present invention is not limited to such a configuration, and three or more first locking portions may be provided to one base portion.

In the energy storage device according to the embodiment and the modifications of the embodiment, two second locking portions each of which is formed of the lower insulating member and the lid body are disposed on one base portion of the current collecting member. However, the present invention is not limited to such a configuration, and one or three or more second locking portions may be provided to one base portion. Further, the positions of the second locking portions are not limited to positions described in the embodiment and the modifications of the embodiment, the second locking portion may be disposed at any position.

In the energy storage device according to the embodiment and the modifications of the embodiment, the positive electrode terminal 30 and the negative electrode terminal 40 respectively include the shaft portions 30b, 40b each of which penetrates the upper insulating member, the lid body and the lower insulating member. However, the present invention is not limited to such a configuration. The shaft portion may be formed as a part separate from the positive electrode terminal, the positive electrode current collecting member, the negative electrode terminal, and the negative electrode current collecting member, and may be formed as a part of the positive electrode current collecting member and a part of the negative electrode current collecting member.

Figure 12:
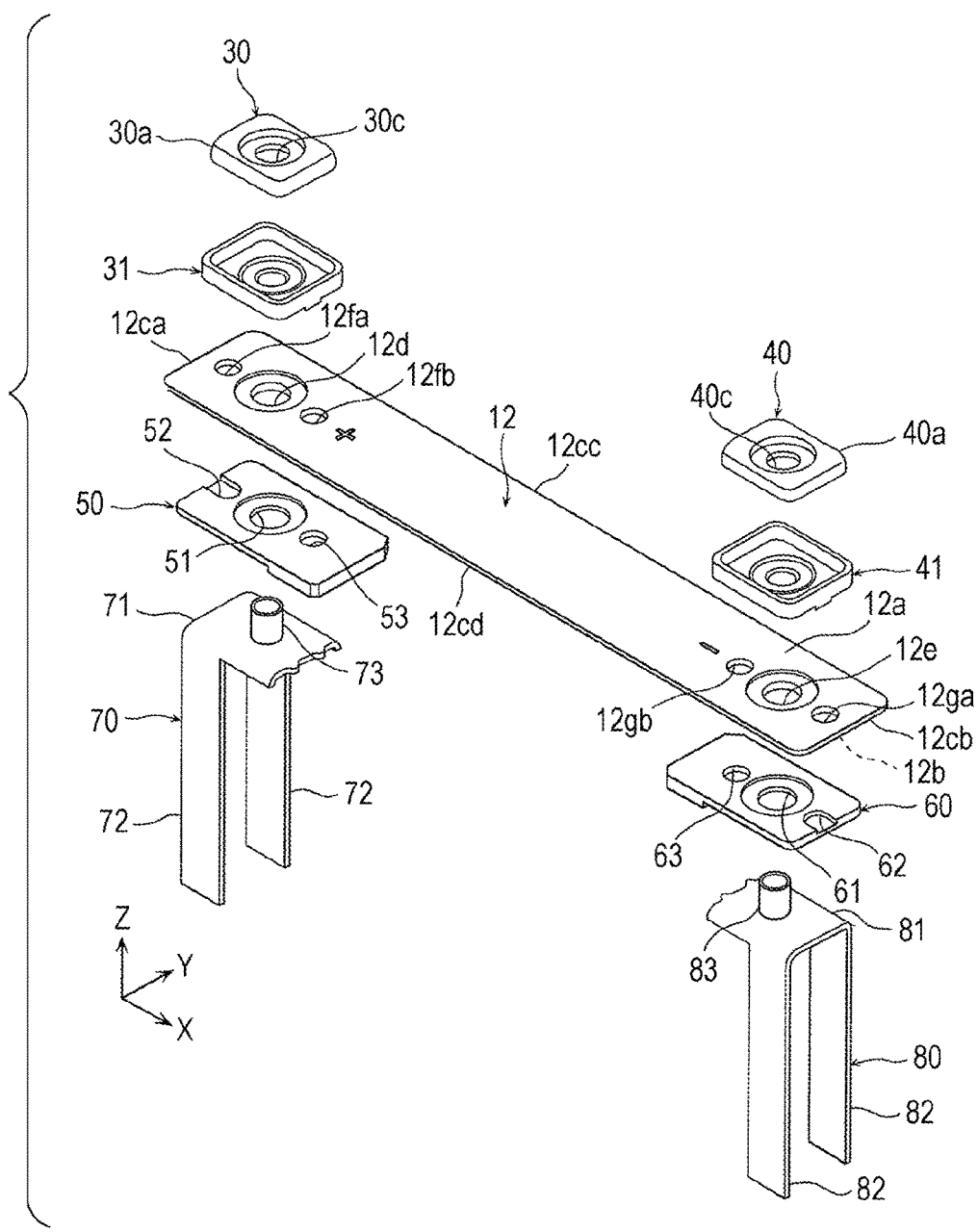
FIG. 12 is an exploded perspective view showing a modification of a connection configuration relating to the positive electrode terminal and the negative electrode terminal of the energy storage device.

For example, as shown in FIG. 12, the shaft portion may be formed integrally with the base portion of the positive electrode current collecting member and the base portion of the negative electrode current collecting member. FIG. 12 is an exploded perspective view showing a modification of a connection configuration relating to the positive electrode terminal 30 and the negative electrode terminal 40 in the energy storage device 100 according to the embodiment in the same manner as FIG. 3. In this modification, the positive electrode current collecting member 70 and the negative electrode current collecting member 80 do not include the through holes 71a, 81a in the base portions 71, 81 respectively, but include circular cylindrical shaft portions 73, 83 extending in a direction opposite to the leg portions 72, 82 from the base portions 71, 81 respectively. Further, the positive electrode terminal 30 and the negative electrode terminal 40 do not include the shaft portions 30b, 40b respectively, but include through holes 30c, 40c which penetrate the terminal bodies 30a, 40a respectively. In joining the positive electrode terminal 30 and the positive electrode current collecting member 70 to each other by swaging, the shaft portion 73 passes through the lower insulating member 50, the lid body 12, the upper insulating member 31, and the through hole 30c of the terminal body 30a, and a distal end portion of the shaft portion 73 which projects outward from the terminal body 30a is swaged thus forming a swaged projecting portion. In the same manner, in joining the negative electrode terminal 40 and the negative electrode current collecting member 80 to each other by swaging, the shaft portion 83 passes through the lower insulating member 60, the lid body 12, the upper insulating member 41, and the through hole 40c of the terminal body 40a, and a distal end portion of the shaft portion 83 which projects outward from the terminal body 40a forms a swaged projecting portion. With such a configuration, each of the shaft portions fixes the above-mentioned constitutional elements which the shaft portion penetrates between the swaged projecting portion and the base portion.

In a case where the shaft portion is formed as a member separate from the positive electrode terminal, the positive electrode current collecting member, the negative electrode terminal, and the negative electrode current collecting member, and the shaft portion and the above-mentioned constitutional elements are joined to each other by swaging, the shaft portion may be configured such that a swaged projecting portion is formed on both ends of the shaft portion, or one end of the shaft portion is formed into a shape having an enlarged diameter such as a flange shape and a swaged projecting portion is formed on the other end of the shaft portion. The shaft portion may be configured to fix the constitutional elements which the shaft portion penetrates between two swaged projecting portions or between one swaged projecting portion and one diameter enlarged portion.

In the energy storage device according to the embodiment and the modifications of the embodiment, the current collecting member of the positive electrode and the current collecting member of the negative electrode respectively include the leg portions extending perpendicularly and in a straight manner from the respective base portions. The configuration of the leg portion is not limited to such a configuration. The leg portion may be bent including curving and bending, may be twisted or may be deformed in other shapes. In this case, a comparison between the positions of the first locking portion, the second locking portion, the third locking portion and the position of the leg portion may be made based on the proximal portion of the leg portion. For example, such a comparison may be made based on a portion of the leg portion closest to the position of the end portion 12ca, 12cb of the lid body 12 in the longitudinal direction of the lid body 12.

According to the embodiment and the modifications of the embodiment, the energy storage device includes the electrode assembly 20 disposed such that the winding axis A extends in a direction along the lid body 12 of the container 10. However, the energy storage device may include an electrode assembly disposed such that a winding axis A extends in a direction substantially perpendicular to the lid body 12.

In the energy storage device according to the embodiment and the modifications of the embodiment, the current collecting member of the positive electrode and the current collecting member of the negative electrode are directly connected to the end portions of the electrode assembly 20 in the winding axis A direction. However, the present invention is not limited to such a configuration. The electrode assembly may be configured such that a positive electrode tab and a negative electrode tab formed as projecting lugs projecting from the positive electrode plate and the negative electrode plate are formed on an end portion of the electrode assembly in the winding axis A direction, and the positive electrode tab and the negative electrode tab are connected to the positive electrode current collecting member and the negative electrode current collecting member respectively.

In the energy storage device according to the embodiment and the modifications of the embodiment, the electrode assembly 20 is the winding-type electrode assembly which is formed by winding the positive electrode plate, the negative electrode plate and the separator together. However, the electrode assembly 20 is not limited to the winding-type electrode assembly. The electrode assembly may be a stacking-type electrode assembly which is formed by stacking a large number of positive electrode plates, a large number of negative electrode plates, and a large number of separators to each other, or may be a Z-type electrode assembly which is formed by folding one set or two or more sets of a positive electrode plate, a negative electrode plate, and a separator which overlap with each other plural times.

The energy storage device according to the embodiment and the modifications of the embodiment includes one electrode assembly 20 in the container 10. However, the energy storage device may include two or more electrode assemblies.

Further, the configurations which are made by arbitrarily combining the configuration of the above-mentioned embodiment and the configurations of the modifications of the embodiment are also included in the scope of the present invention. The present invention may include not only the above-mentioned energy storage device but also an energy storage apparatus including one or more energy storage devices. For example, the energy storage apparatus can be realized as an apparatus including the plurality of energy storage devices 100. The energy storage apparatus includes a plurality of energy storage units disposed in parallel to each other, and each energy storage unit is formed of the plurality of energy storage devices 100 which are arranged in a row and are electrically connected to each other, for example. Due to the above-mentioned configuration, the plurality of energy storage devices 100 are used as one unit, and the number of energy storage units and an arrangement of the energy storage units may be selected corresponding to an electric capacity necessary for the energy storage apparatus, and a shape, a size and the like of the energy storage apparatus. The energy storage apparatus including the plurality of energy storage devices 100 and having high output can be mounted as a power source for a vehicle such as an electric vehicle (EV), a hybrid electric vehicle (HEV), a plug-in hybrid electric vehicle (PHEV), or an automated guided vehicle (AGV).

The present invention is applicable to an energy storage device such as a lithium ion secondary battery and the like.

What is claimed is:

1. An energy storage device comprising:
    an electrode assembly;
    a container which accommodates the electrode assembly and includes a lid body extending in a longitudinal direction;
    a shaft which penetrates the lid body;
    a current collecting member which has a leg portion to be connected to the electrode assembly;
    an insulating member which is disposed between the current collecting member and the lid body; and
    a first locking portion for locking a rotation of the current collecting member about the shaft with respect to the insulating member,
    wherein the first locking portion includes: a recessed portion or a projecting portion formed on the insulating member, and a projecting portion or a recessed portion formed on the current collecting member,
    the recessed portion or the projecting portion formed on the insulating member is indented away from the shaft or projects toward the shaft in a direction which intersects with the shaft,
    the projecting portion or the recessed portion formed on the current collecting member projects away from the shaft or is indented toward the shaft in the direction which intersects with the shaft,
    the recessed portion or the projecting portion formed on the insulating member and the projecting portion or the recessed portion formed on the current collecting member are configured to engage with each other, and
    the leg portion is positioned closer to an end portion of the lid body in the longitudinal direction than the first locking portion is.

2. The energy storage device according to claim 1, wherein the recessed portion or the projecting portion formed on the insulating member is the recessed portion formed on the insulating member,
    the recessed portion formed on the insulating member is indented away from the shaft in the direction which intersects with the shaft,
    the projecting portion or the recessed portion formed on the current collecting member is the projecting portion formed on the current collecting member,
    the projecting portion formed on the current collecting member projects away from the shaft in the direction which intersects with the shaft, and
    the recessed portion and the projecting portion are configured to engage with each other.

3. The energy storage device according to claim 1, wherein the recessed portion or the projecting portion formed on the insulating member is the projecting portion formed on the insulating member,
- the projecting portion formed on the insulating member projects toward the shaft in the direction which intersects with the shaft,
- the projecting portion or the recessed portion formed on the current collecting member is the recessed portion formed on the current collecting member,
- the recessed portion formed on the current collecting member is indented toward the shaft in the direction which intersects with the shaft, and
- the projecting portion and the recessed portion are configured to engage with each other.

4. The energy storage device according to claim 1, wherein the first locking portion is disposed on at least one of both ends of the current collecting member in the longitudinal direction of the lid body.

5. The energy storage device according to claim 1, further including a second locking portion for locking the rotation of the insulating member with respect to the lid body about the shaft, wherein the second locking portion includes: a projecting portion which projects from the lid body in a direction parallel to the shaft; and a receiving portion which is formed on the insulating member and is configured to engage with the projecting portion, and the projecting portion and the receiving portion are configured to engage with each other.

6. The energy storage device according to claim 1, wherein a gap is formed in the first locking portion between a portion of the first locking portion around the projecting portion or the recessed portion formed on the current collecting member and a portion of the first locking portion around the recessed portion or the projecting portion formed on the insulating member.

7. The energy storage device according to claim 1, wherein the insulating member includes a protruding portion which projects in a direction parallel to the shaft, the current collecting member includes a hole, and the protruding portion is fitted into the hole.

* * * * *